(12) United States Patent
Shirai et al.

(10) Patent No.: US 8,275,127 B2
(45) Date of Patent: *Sep. 25, 2012

(54) CRYPTOGRAPHIC PROCESSING APPARATUS, CRYPTOGRAPHIC PROCESSING METHOD, AND COMPUTER PROGRAM THEREFOR

(75) Inventors: Taizo Shirai, Kanagawa (JP); Bart Preneel, Leuven (BE)

(73) Assignee: Sony Corporation, Tokyo (JP)

( * ) Notice: Subject to any disclaimer, the term of this patent is extended or adjusted under 35 U.S.C. 154(b) by 99 days.

This patent is subject to a terminal disclaimer.

(21) Appl. No.: 12/780,512

(22) Filed: May 14, 2010

(65) Prior Publication Data
US 2011/0026706 A1 Feb. 3, 2011

Related U.S. Application Data

(63) Continuation of application No. 10/577,955, filed as application No. PCT/JP2005/015815 on Aug. 30, 2005, now Pat. No. 7,747,011.

(30) Foreign Application Priority Data

Sep. 3, 2004 (JP) ................................. 2004-256465

(51) Int. Cl.
*H04K 1/04* (2006.01)
*H04L 9/00* (2006.01)
(52) U.S. Cl. ............... 380/28; 380/27; 380/37; 713/189
(58) Field of Classification Search .................... None
See application file for complete search history.

(56) References Cited

U.S. PATENT DOCUMENTS

| | | | |
|---|---|---|---|
| 7,194,090 B2* | 3/2007 | Muratani et al. | 380/29 |
| 7,227,948 B2* | 6/2007 | Ohkuma et al. | 380/37 |
| 7,433,470 B2* | 10/2008 | Shirai et al. | 380/37 |
| 2002/0021801 A1* | 2/2002 | Shimoyama et al. | 380/29 |
| 2009/0010425 A1 | 1/2009 | Shibutani et al. | |

(Continued)

FOREIGN PATENT DOCUMENTS

JP 2002-23623 1/2002

(Continued)

OTHER PUBLICATIONS

Jérôme Lacan, "Constructions de codes MDS", (travail realise conjointement avec Jërôme Fimes), DMI : Departement Mathématiques appliquées et Informatique, May 24, 2004, XP007907064, 45 pages.

(Continued)

*Primary Examiner* — Kaveh Abrishamkar
(74) *Attorney, Agent, or Firm* — Oblon, Spivak, McClelland, Maier & Neustadt, L.L.P.

(57) ABSTRACT

The invention realizes a high-security cryptographic processing apparatus that increases difficulty in analyzing its key and a method therefor. In Feistel-type common-key-block cryptographic processing that repeatedly executes an SPN-type F-function having the nonlinear conversion section and the linear conversion section over a plurality of rounds, Linear conversion processing of an F-function corresponding to each of the plurality of rounds is carried out by linear conversion processing that applies square MDS (Maximum Distance Separable) matrices. The invention uses a setting that arbitrary m column vectors included in inverse matrices of square MDS matrices being set up at least in consecutive even-numbered rounds and in consecutive odd-numbered rounds, respectively, constitute a square MDS matrix. This structure realizes cryptographic processing whereby resistance to linear cryptanalysis attacks in the common-key-block cipher is improved.

19 Claims, 18 Drawing Sheets

U.S. PATENT DOCUMENTS

| | | |
|---|---|---|
| 2009/0103716 A1 | 4/2009 | Shirai |
| 2010/0002872 A1 | 1/2010 | Shibutani et al. |
| 2010/0061548 A1 | 3/2010 | Shirai et al. |

FOREIGN PATENT DOCUMENTS

| | | |
|---|---|---|
| JP | 2002-91295 | 3/2002 |
| JP | 2002-91297 | 3/2002 |
| JP | 2004-245988 | 9/2004 |
| JP | 2005-107078 | 4/2005 |

OTHER PUBLICATIONS

Jérôme Lacan, "Constructions de codes MDS", (travail realise conjointement avec Jérôme Fimes), DMI: Département Mathématiques appliquées et Informatique, May 24, 2004, XP007907064, 45 pages.

Taizo Shirai, et al., "Improving Immunity of Feistel Ciphers Against Differential Cryptanalysis by Using Multiple MDS Matrices", Fast Software Encryption Lecture Notes in Computer Science, XP 019007568, vol. 3017, Feb. 5, 2004, pp. 260-278.

Taizo Shirai, et al., "On Feistel Ciphers Using Optimal Diffusion Mappings Across Multiple Rounds", Lecture Notes in Computer Science, XP 003015809, vol. 3329, No. 10, Dec. 5, 2004, pp. 1-15.

Kenji Ohkuma, et al., "Nest type SPN structure", The Institute of Electronics, Information and Communication Engineers, vol. 99, No. 702, Mar. 17, 2000, pp. 99-104 (with English Abstract).

* cited by examiner

FIG. 3 example) $n=8, m=8$ $$\begin{pmatrix} Y[1] \\ Y[2] \\ \vdots \\ Y[8] \end{pmatrix} = \begin{pmatrix} a_{1,1} & a_{1,2} & \cdots & a_{1,8} \\ a_{2,1} & a_{2,2} & \cdots & a_{2,8} \\ \vdots & \vdots & \ddots & \vdots \\ a_{8,1} & a_{8,2} & \cdots & a_{8,8} \end{pmatrix} \begin{pmatrix} Z[1] \\ Z[2] \\ \vdots \\ Z[8] \end{pmatrix}$$

$a_{i,j} \in GF(2^8), 1 \leq i, j \leq 8$

NONLINEAR CONVERSION SECTION

OUTPUT Y, $mn$ bit 122, 125

FIG.8 example) $n=8, m=8$ $$\begin{pmatrix} 9d & b4 & d3 & 5d & 84 & ae & ec & b9 \\ 29 & 34 & 39 & 60 & 5c & 81 & 25 & 13 \\ 67 & 6a & d2 & e3 & 4b & db & 9d & 4 \\ 8e & d7 & e6 & 1b & 8b & 9e & 3a & 91 \\ d9 & e5 & 4d & dd & c6 & 5 & f0 & ad \\ 2a & f7 & 67 & 72 & b1 & 7 & f2 & 27 \\ 42 & e6 & a0 & 4 & f1 & 4 & 7d & 8c \\ 55 & 63 & fa & 51 & c & d9 & 28 & d6 \end{pmatrix}$$

FIG. 17

CASE OF q=6, n=8, AND m=8

START → S601

FIRST, GENERATE SIX MDS MATRICES $M_1, M_2, \ldots, M_6$ AT RANDOM $$\begin{pmatrix} 9d & b4 & d3 & 5d & 84 & ae & ec & b9 \\ 29 & 34 & 39 & 60 & 5c & 81 & 25 & 13 \\ 67 & 6a & d2 & e3 & 4b & db & 9d & 4 \\ 8e & d7 & e6 & 1b & 8b & 9e & 3a & 91 \\ d9 & e5 & 4d & dd & c6 & 5 & f0 & ad \\ 2a & f7 & 67 & 72 & b1 & 7 & f2 & 27 \\ 42 & e6 & a0 & 4 & f1 & 4 & 7d & 8c \\ 55 & 63 & fa & 51 & c & d9 & 28 & d6 \end{pmatrix}$$

S602

SECOND, CHECK WHETHER EIGHT COLUMN VECTORS SELECTED ARBITRARILY FROM 48 COLUMN VECTORS INCLUDED IN THE ABOVE-MENTIONED SIX MATRICES CONSTITUTE AN MDS MATRIX $(C_1 \ C_2 \ C_3 \ C_4 \ C_5 \ C_6 \ C_7 \ C_8) = MDS$ ?

NO → back to S601
YES ↓ S603

THIRD, CALCULATE INVERSE MATRICES $M_1^{-1}, M_2^{-1}, \ldots, M_6^{-1}$ OF THE ABOVE-MENTIONED SIX MATRICES, AND CHECK WHETHER EIGHT ROW VECTORS SELECTED ARBITRARILY FROM 16 ROW VECTORS INCLUDED IN TWO ADJACENT INVERSE MATRICES CONSTITUTE AN MDS MATRIX ($M_1^{-1}$ AND $M_6^{-1}$ SHALL BE CONSIDERED AS ABJACENT MATRICES AND INSPECTED)

$({}^tR_1 \ {}^tR_2 \ {}^tR_3 \ {}^tR_4 \ {}^tR_5 \ {}^tR_6 \ {}^tR_7 \ {}^tR_8) = MDS$ ?

NO → back to S601
YES ↓ S604

FOURTH, IF THE FLOW PASSES ALL THE CHECKS, OUTPUT SIX MDS MATRICES AS $L_1, L_2, \ldots, L_6$

END

CRYPTOGRAPHIC PROCESSING APPARATUS, CRYPTOGRAPHIC PROCESSING METHOD, AND COMPUTER PROGRAM THEREFOR

CROSS REFERENCE TO RELATED APPLICATIONS

This application is a continuation application of U.S. patent application Ser. No. 10/577,955, now U.S. Pat. No. 7,747,011, filed Dec. 8, 2006, the entire contents of which are incorporated by herein by reference. U.S. application Ser. No. 10/577,955, now U.S. Pat. No. 7,747,011, is a National Stage of PCT/JP05/15815, filed Aug. 30, 2005, and claims priority to Japanese Patent Application No. 2004-256465, filed Sep. 3, 2004.

TECHNICAL FIELD

This invention relates to a cryptographic processing apparatus, a cryptographic processing method, and a computer program therefor, and more specifically to a cryptographic processing apparatus with improved resistance to linear analysis and differential analysis known as decipher analysis processing and cryptanalysis attack processing, a cryptographic processing method, and a computer program therefor.

BACKGROUND ART

These days, with development of network communications and electronic commerce, security ensuring in communications becomes a vital issue. One means of security ensuring is a cryptographic technology, and currently communications using various cryptographic techniques are actually being executed.

For example, there has been put in practical use a system in which a cryptographic processing module is embedded into a small device, such as an IC card, data transmission and reception is performed between the IC card and a reader/writer acting as a data reading and writing device, authentication processing or encryption/decryption of send/receive data is performed.

There are various algorithms in cryptographic processing, which are broadly divided into the one key cryptographic system in which different encryption key and decryption key, for example, a public key and a secret key, are set and the common key cryptographic system in which a common key is set as an encryption key and a decryption key.

There are also various algorithms in the common key cryptographic system. One of them is a system in which a plurality of keys are generated using a common key as a base and data conversion processing is repeatedly performed for each unit of block (64 bits, 128 bits, etc.) using the plurality of generated keys. A typical algorithm that applies such a key generation method and data conversion processing is a common-key-block cryptographic method.

As a typical algorithm of common-key-block cryptographic processing, for example, there is a DES (Data Encryption Standard) algorithm as a United States federal standard encryption, and is widely used in various fields.

Any algorithm of the common-key-block cryptographic processing typified by the DES can mainly be divided into a round function section for performing conversion of input data and a key schedule section for generating a key to be applied in each round of a round function (F-function) part. A round key (subkey) to be applied in each round of the round function section is generated in the key schedule section to which one master key (main key) is inputted, and is applied in each round function part.

However, in such common key cryptographic processing, leakage of the key by cryptanalysis has become a problem. As a typical technique of cryptanalysis or attack technique, there are known a differential analysis (also called differential cryptanalysis method or differential cryptanalysis attack) in which an application key in each round function is analyzed by analyzing many inputs data (plaintext) and its output data (ciphertext), and a linear analysis (also called linear cryptanalysis method or linear cryptanalysis attack) that carries out an analysis based on plaintexts and corresponding ciphertexts.

That it is easy to analyze a key by cryptanalysis means low safety of the cryptographic processing. In the conventional DES algorithm, there is a problem that, since the processing (conversion matrix) to be applied in a linear conversion section in a round function (F-function) section is equivalent in a round of each stage, cryptanalysis is easy to do, and consequently it results in easy analysis of the key.

DISCLOSURE OF THE INVENTION

Problem to be Solved by the Invention

This invention is made in view of the above-mentioned problems, and has as its object to provide a cryptographic processing apparatus that realizes a common-key-block cryptographic algorithm highly resistant to linear analysis and differential analysis, a cryptographic processing method, and a computer program therefor.

Means for Solving the Problem

A first aspect of this invention is directed to a cryptographic processing apparatus for performing Feistel-type common-key-block cryptographic processing, which is configured to execute an SPN-type F-function having a nonlinear conversion section and the linear conversion section over a plurality of rounds, wherein the linear conversion section of the F-function corresponding to each of the plurality of rounds has a configuration of performing linear conversion processing for n bit outputted from each of the m nonlinear conversion sections, totally mn bit, as linear conversion processing that applies square MDS (Maximum. Distance Separable) matrices, and at least in the consecutive even-numbered rounds and in the consecutive odd-numbered rounds, different square MDS matrices $L_a$, $L_b$ are applied, and a matrix composed of m column vectors selected arbitrarily from column vectors constituting inverse matrices of the square MDS matrices $L_a^{-1}$, $L_b^{-1}$ is linearly independent.

Moreover, in one embodiment of the cryptographic processing apparatus of this invention, the cryptographic processing apparatus is characterized in that a matrix composed of m column vectors selected arbitrarily from column vectors constituting the inverse matrices $L_a^{-1}$, $L_b^{-1}$ is a square MDS matrix.

Furthermore, in one embodiment of the cryptographic processing apparatus of this invention, its algorithm is characterized in that the algorithm of the Feistel-type common-key-block cryptographic processing is a cryptographic algorithm of round number 2r, and the linear conversion section of the F-function is configured to perform linear conversion processing that applies q kinds ($2 \leq q < r$) of different squire MDS matrices sequentially and repeatedly in all of the r even-numbered rounds and in all of the r odd-numbered rounds.

Furthermore, in one embodiment of the cryptographic processing apparatus of this invention, the cryptographic processing apparatus is characterized in that each of the plurality of square MDS matrices to be applied in the linear conversion section of the F-function is a square MDS matrix that is composed of m column vectors selected arbitrarily from column vectors constituting the plurality of square MDS matrices and is linearly independent.

Furthermore, in one embodiment of the cryptographic processing apparatus of this invention, the cryptographic processing apparatus is characterized in that each of the plurality of square MDS matrices to be applied in the linear conversion section of the F-function is a square MDS matrix such that a matrix composed of m column vectors selected arbitrarily from column vectors constituting the plurality of square MDS matrices also makes up a square MDS matrix.

Furthermore, in one embodiment of the cryptographic processing apparatus of this invention, the cryptographic processing apparatus is characterized in that each of the plurality of square MDS matrices to be applied in the linear conversion section of the F-function is made up of a matrix that is composed of column vectors extracted from a matrix M' composed of row vectors selected from a square MDS vector M including all elements constituting the plurality of square MDS matrices.

A second aspect of this invention is a cryptographic method of performing the Feistel-type common-key-block cryptographic processing, characterized in that the SPN-type F-function for performing nonlinear conversion processing and linear conversion processing is repeatedly performed over a plurality of rounds, the linear conversion processing of the F-function corresponding to the plurality of rounds performs linear conversion processing of n bit outputted from the m nonlinear conversion sections, totally mn bits, as linear convention processing that applies square MDS (Maximum Distance Separable) matrices, at least in the consecutive even-numbered rounds and in the consecutive odd-numbered rounds different square MDS matrices $L_a^{-1}, L_b^{-1}$ are applied, and the linear conversion processing with square MDS matrices such that a matrix composed of m column vectors selected arbitrarily from column vectors constituting the inverse matrices $L_a^{-1}, L_b^{-1}$ of the square MDS matrices is linearly independent is performed.

Moreover, in one embodiment of the cryptographic processing method of this invention, the cryptographic processing apparatus is characterized by performing linear conversion processing with square MDS matrices such that a matrix composed of m column vectors selected arbitrarily from column vectors constituting the inverse matrices $L_a^{-1}, L_b^{-1}$ is a square MDS matrix.

Furthermore, in one embodiment of the cryptographic processing method of this invention, the algorithm of the Feistel-type common-key-block cryptographic processing is characterized by being a cryptographic algorithm of round number 2r, wherein the linear conversion processing of the F-function is execution of linear conversion processing by applying q ($2 \leq q < r$) kinds of different square MDS matrices sequentially and repeatedly in all of the r even-numbered rounds and in all of the r odd-numbered rounds.

Furthermore, in one embodiment of the cryptographic processing method of this invention, the cryptographic processing method is characterized in that each of the plurality of different square MDS matrices to be applied to the linear conversion processing in the F-function is a square MDS matrix that is composed of m column vectors selected arbitrarily from column vectors constituting the plurality of square MDS matrices and is linearly independent.

Furthermore, in one embodiment of the cryptographic processing method of this invention, the cryptographic processing method is characterized in that each of the plurality of different square MDS matrices to be applied to the linear conversion processing of the F-function is a square MDS matrix such that a matrix composed of m column vectors selected arbitrarily from column vectors constituting the plurality of square MDS matrices is also a square MDS matrix.

Furthermore, in one embodiment of the cryptographic processing method of this invention, the cryptographic processing method is characterized in that each of the plurality of different square MDS matrices to be applied to the linear conversion processing of the F-function is made up of a matrix composed of column vectors selected from a matrix M' composed of row vectors selected from a square MDS matrix including all elements constituting the plurality of square MDS matrices.

A third aspect of this invention is a computer program for performing the Feistel-type common-key-block cryptographic processing, which comprises the step of repeatedly executing the SPN-type F-function of performing nonlinear conversion processing and linear conversion processing over a plurality of rounds, wherein the linear conversion processing of the F-function corresponding to each of the plurality of rounds is a linear conversion step of performing the linear conversion processing of an input of n bit outputted from each of the m nonlinear conversion sections, totally mn bit, as linear conversion processing that applies square MDS (Maximum Distance Separable) matrices. In the linear conversion step, at least in the consecutive even-numbered rounds and in the consecutive odd-numbered rounds different square MDS matrices $L_a, L_b$ are applied, and each of the square MDS matrices is such that a matrix composed of m column vectors selected arbitrarily from column vectors constituting the inverse matrices $L_a^{-1}, L_b^{-1}$ of the square MDS matrices is linearly independent.

Note that, the computer program of this invention is a computer program that can be provided, for example, to a computer system capable of executing various program codes by means of any of storage media and communication media in a computer readable form (for example, storage media of a CD, a FD, an MO, etc. or communication media of a network etc.). By providing such a program in the computer-readable form, processing that corresponds to the program is realized on a computer system.

Further other objects, features, and advantages of this invention will become apparent from the following description of the preferred embodiments of this invention as illustrated in the accompanying drawings. Note that in this description, the system is one that has a structure of logical combination of a plurality of devices, but being not limited to systems each having its own devices in the same enclosure.

According to the configuration of this invention, the cryptographic processing is configured as follows in the Feistel-type common-key-block cryptographic processing of executing the SPN-type F-function that has the nonlinear conversion section and the linear conversion section repeatedly over a plurality of rounds: Linear conversion processing of the F-function corresponding to each of the plurality of rounds is executed as linear conversions processing that applies square MDS (Maximum Distance Separable) matrices. And it is configured to execute linear conversion processing with square MDS matrices wherein square MDS matrices $L_a, L_b$ that are different at least in the consecutive even-numbered rounds and in the consecutive odd-numbered rounds are applied, and a matrix composed of m column vectors selected arbitrarily from column vectors constituting the inverse matrices $L_a^{-1}$, $L_b^{-1}$ of the square MDS matrices is linearly independent or makes up a square MDS matrix. Accordingly, resistance to linear cryptanalysis attacks in the common-key-block cipher is enhanced and difficulty in analyzing an encryption key etc. is increased; therefore, high-security cryptographic processing is realized.

Furthermore, according to the configuration of this invention, in the processing of the Feistel-type common-key-block cryptographic processing in which the SPN-type F-function having the nonlinear conversion section and the linear conversion section is repeatedly executed over a plurality of rounds, linear conversion processing of the F-function corresponding to each of the plurality of rounds is executed as linear conversion processing that applies square MDS (Maximum Distance Separable) matrices, while the processing is so configured that square MDS matrices that are different at least in the consecutive odd-numbered rounds and in the consecutive even-numbered rounds are applied, and these square MDS matrices themselves are configured to exhibit linear independence or make up square MDS matrices. Therefore, it is possible to guarantee for simultaneous difference cancellation by contribution of active S-boxes not to occur, and consequently to enlarge a minimum number of the active S-box in the whole of a cryptographic function that is one of indexes of the resistance to differential cryptanalysis attacks in a common-key-block cipher. This configuration enhances the resistance to both linear cryptanalysis attacks and differential cryptanalysis attacks, and higher-security cryptographic processing is realized.

BRIEF DESCRIPTION OF THE DRAWINGS

FIG. 2A is a diagram showing an input and an output of the F-function 120 in one round. FIG. 2B is a diagram showing details of the structure of the F-function 120.

FIG. 3 is a diagram showing an example of a square matrix to be applied to linear conversion processing.

FIG. 8 shows an example of the square MDS matrix.

FIG. 17 is a flowchart explaining a processing example of generating square MDS matrices that realize improved resistance to differential cryptanalysis attacks and linear cryptanalysis attacks as a generation technique of square MDS matrices that are the linear conversion matrices to be set in the F-functions of respective rounds.

BEST MODE FOR CARRYING OUT THE INVENTION

Hereafter, details of a cryptographic processing apparatus of this invention, a cryptographic processing method, and a computer program therefor will be explained. The explanation will be given in the following order of items.

1. Differential analysis processing in a common-key-block cryptographic algorithm 2. Linear analysis processing in the common-key-block cryptographic algorithm 3. Cryptographic algorithm based on this invention
   (3-a) Example of generation of square MDS matrices that realize improved resistance to differential cryptanalysis attacks and setting them to the F-functions
   (3-b) Example of generation of square MDS matrices that realize improved resistance to linear cryptanalysis attacks and setting them to the F-functions
   (3-c) Example of generation of square MDS matrices that realize improved resistance to differential cryptanalysis attacks and linear cryptanalysis attacks and setting them to the F-functions.

[1. Differential Analysis Processing in Common-Key-Block Cryptographic Algorithm]

First, an outline of the differential analysis processing in the common-key-block cryptographic algorithm typified by DES (Data Encryption Standard) cryptographic processing will be explained using a generalized model of common-key-block cryptographic processing.

The algorithm of the common-key-block cryptographic processing can mainly be divided into a round function section for performing conversion of input data and a key schedule section for generating a key to be applied in each round of the round function part. A key (subkey) applied in each round of the round function is generated by the key schedule section to which one master key (main key) is inputted, based on it, and is applied in each round. Among typical systems of this common key cryptographic system, there is a DES (Data Encryption Standard) as a U.S. Federal standard system.

Figure 1:
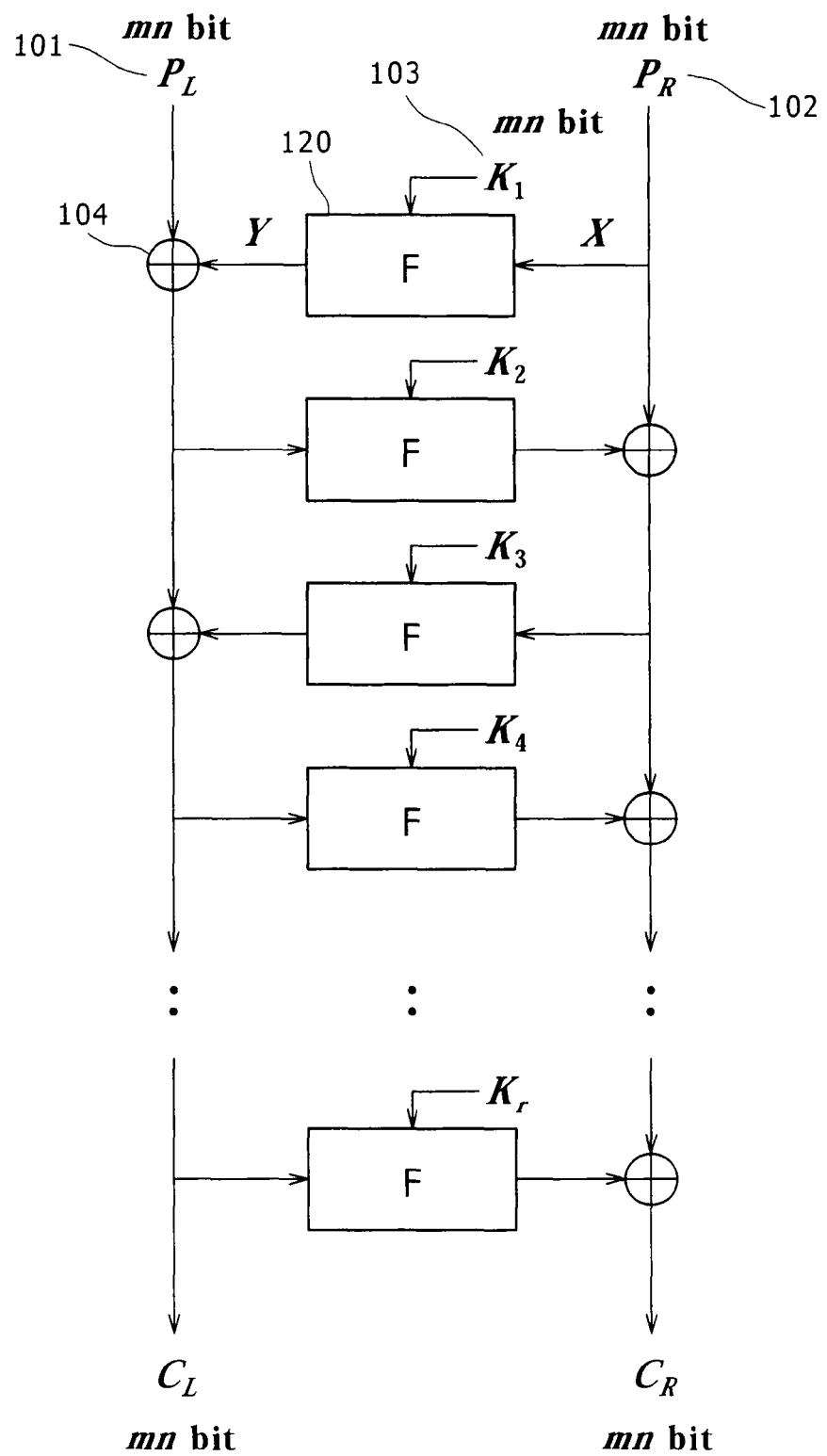
FIG. 1 is a diagram showing a configuration of a typical common-key-block cipher having a Feistel structure.

A structure of the typical common-key-block cryptographic processing called Feistel structure will be explained with reference to FIG. 1.

The Feistel structure has a configuration of converting a plaintext into a ciphertext by simple repetition of a conversion function. The length of a plaintext is set to 2 nm (2×m×n) bit. Here, m and n are both integers. Firs, a plaintext of 2 nm bit is divided into two input data, a $P_L$ (Plain-Left) 101 of mn bit and a $P_R$ (Plain-Right) 102 of mn bit, and they are used as input values.

The Feistel structure is expressed by repetition of a basic structure called round function, and a data conversion function being included in each round is called an F-function 120. FIG. 1 shows an example configuration composed of the F-functions (round functions) 120 repeated for r-stages.

For example, in the first round, input data X of mn bit and a round key $K_1$ 103 of mn bit inputted from a key generation unit (not shown in the figure) are inputted into the F-function 120, which outputs data Y of mn bit after data conversion processing therein. An exclusive-OR section 104 executes an exclusive-OR operation on the output and the other pieces of input data from the preceding stage, and outputs an operation result of mn bit to the next round function. Cryptographic processing completes by applying this processing, i.e., the F-function repeatedly for a predetermined round number (r), and outputs divided data CL (Cipher-Left) and data CR (Cipher-Right) of a ciphertext. The above configuration leads to a fact that in order to perform deciphering with the Feistel structure, it is only necessary to make reverse a sequence of inserting round keys, not necessary to configure an inverse function.

Figure 2A:
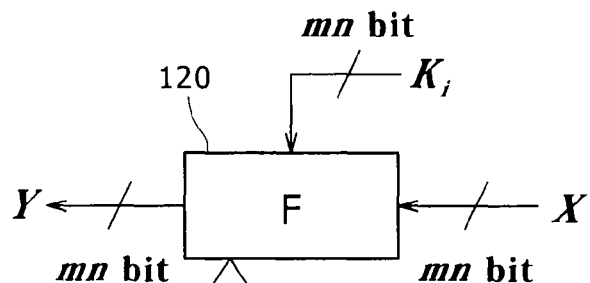
FIGS. 2A and 2B are diagrams explaining a structure of an F-function being set up as a round function section.
Figure 2B:
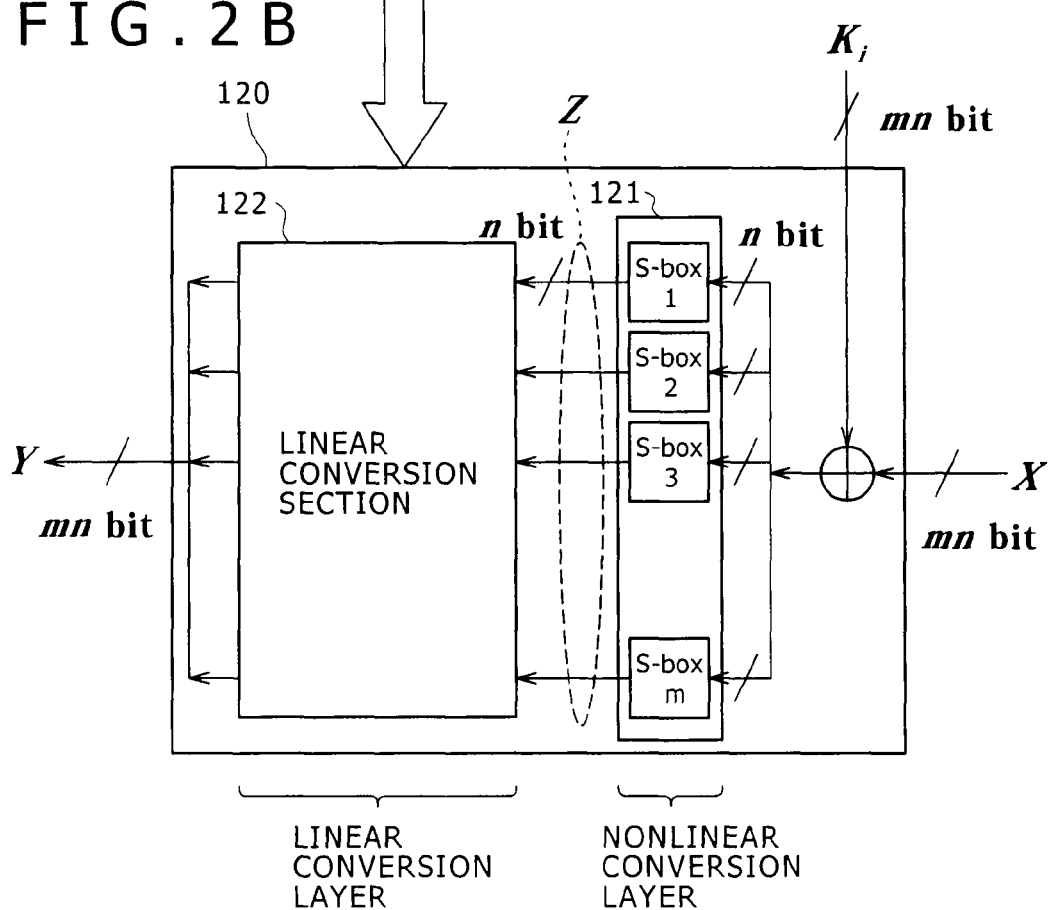

The structure of the F-function 120 being set up as a function of each round will be explained with reference to FIG. 2. FIG. 2A is a diagram showing an input and an output of the F-function 120 in one round. FIG. 2B is a diagram showing details of the structure of the F-function 120. The F-function 120 has the so-called SPN-type structure consisting of a nonlinear conversion layer and a linear conversion layer connected together, as shown in FIG. 2B.

The SPN-type F-function 120 has a plurality of S-boxes 121 for performing nonlinear conversion processing, as shown in FIG. 2B. The exclusive-OR operation is executed on an input value X of mn bit from a preceding stage of the round function section together with a round key $K_i$ inputted from the key schedule section, and its output is inputted to a plurality (m) of S-boxes each of which executes nonlinear conversion processing by n bit. Each of the S-boxes performs nonlinear conversion processing that applies, for example, a conversion table.

An output value Z of mn bit that is output data from the S-box 121 is inputted into a linear conversion section 122 for performing linear conversion processing, which executes linear conversion processing, for example, processing of exchanging bit positions etc., and outputs an output value Y of mn bit. The output value Y together with input data from the preceding stage is subjected to the exclusive-OR operation, and its result is assigned to an input value of the F-function of the next round.

In the F-function 120 shown in FIG. 2, the bit length of an input/output is m×n (m, n: integer), the nonlinear conversion layer has a configuration in which m S-boxes 121 each serving as the nonlinear conversion layer whose input and output are n bit are arranged in parallel, and the linear convention section 122 as the linear conversion layer executes linear conversion processing based on an m-th square matrix that has elements on an extension field $GF(2^n)$ defined by an n-th irreducible polynomial as its elements.

FIG. 3 shows an example of a square matrix to be applied to the linear conversion processing in the linear conversion section 122. A square matrix 125 shown in FIG. 3 is an example of n=8 and m=8. Linear conversion is executed on m n bit data Z[1], Z[2], ..., Z[m] outputted from the nonlinear conversion section (S-box 121) that applies the predetermined square matrix 125, and Y [1], Y [2], ..., Y [m] as outputs of the F-function (round function) output are determined. Note that linear operation of elements of a matrix of each data is executed on the predetermined extension field $GF(2^n)$ of 2.

Since the hitherto used Feistel-type cipher uses the same linear conversion layer for the F-functions of all the stages, there is a property that a plurality of differences cancel out simultaneously when the differences propagate. As explained in the paragraph of the background art, as a typical cryptanalysis technique, there is known a differential analysis (or difference decryption technique) in which an application key for each round function is analyzed by analyzing many inputs data (plaintext) and its output data (ciphertext). In the conventional common-key-block cryptographic processing such as the DES cryptographic algorithm, since processing (conversion matrix) to be applied in the linear conversion section 122 of the F-functions 120 is set to be equivalent in a round of each stage, it is easy to carry out differential analysis and as a result brings easy analysis of a key.

An example where a plurality of differences cancel out simultaneously at the time of propagation of the differences will be explained with reference to FIG. 4. In this description, when expressing a difference, the difference is indicated by adding a symbol Δ (delta).

Figure 4:
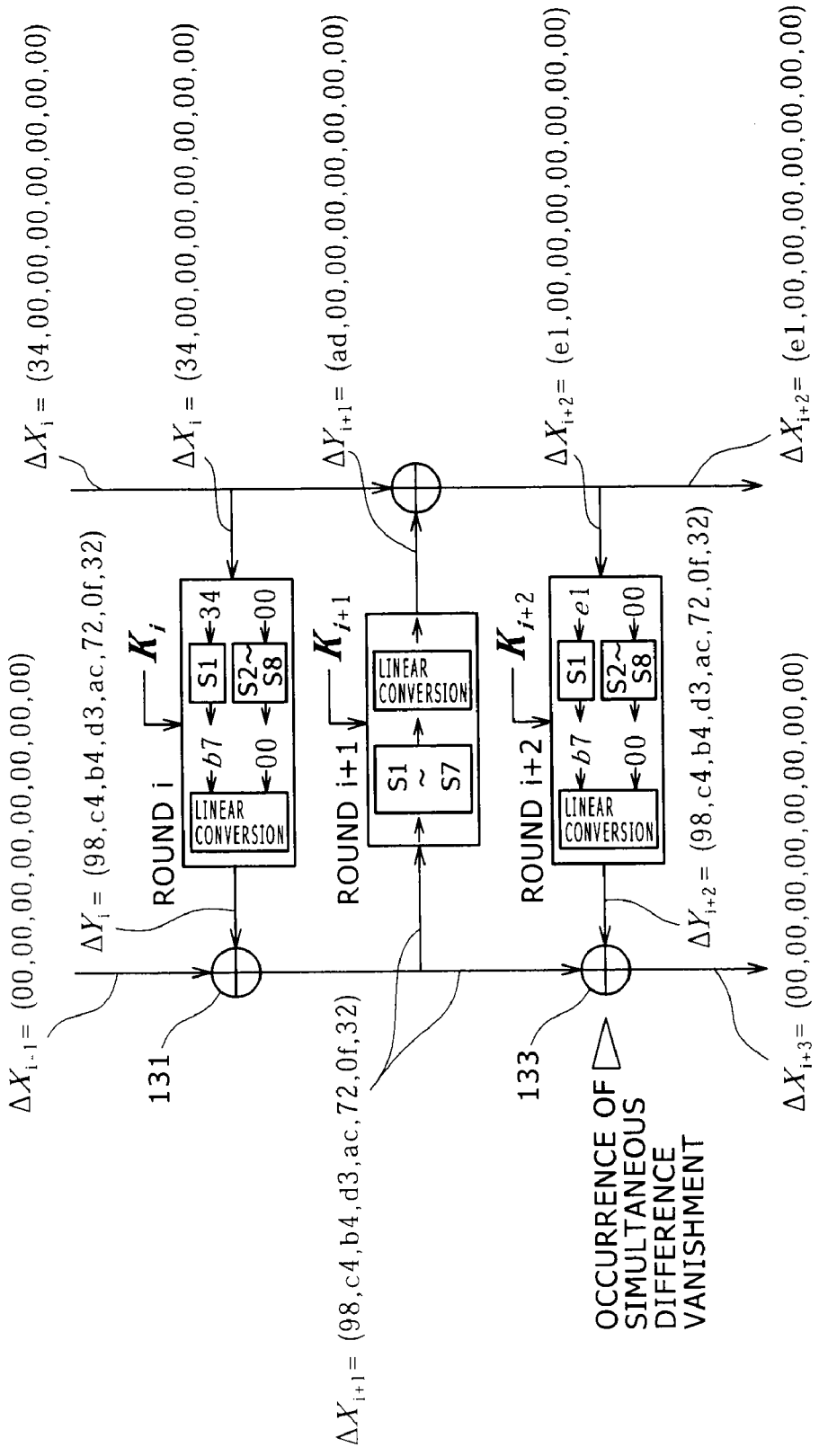
FIG. 4 is a diagram explaining the simultaneous difference cancellation of three stages in a 128-bit block cipher of m=8 and n=8.

FIG. 4 is a diagram explaining the simultaneous difference cancellation of three stages in a 128-bit block cipher of m=8 and n=8. Note that in the figure, 64 bit data shall be divided per byte, each one shall be expressed as a vector, and each element shall be represented in hexadecimal.

The simultaneous difference cancellation in the F-function having a three-stage structure occurs, for example, based on a setting mechanism of the following data states 1-4. The data states generated by a mechanism that will be explained below are data states that can be generate by setting up many difference inputs data, that is, this can be generated in analyzing a key (round key) in the so-called differential analysis.

(State 1)

Suppose the left half of the input difference to round consists of input differences of all zeros ($\Delta X_{i-1}$=(00, 00, 00, 00, 00, 00, 00, 00)) and the right half thereof consists of input differences of all zeros except for an input to only one S-box ($\Delta X_{i-1}$=(34, 00, 00, 00, 00, 00, 00, 00)). This data state indicates that by setting up many difference inputs data, such a data state can be obtained in round i.

The eight elements in $\Delta X_i$=(34, 00, 00, 00, 00, 00, 00, 00) correspond to input differences corresponding to the respective m S-boxes (m=8) structured in the F-function. A difference (34) is inputted into the first S-box ((S1) in FIG. 4), and (00)'s are input differences to the second to eighth boxes.

Here, an output difference of an S-box having an input difference of zero (00) is zero (00). As far as the difference data is concerned, the S-box having an input difference of zero (00) causes no effect, accordingly being called an S-box that is not active, i.e., an inactive S-box. On the other hand, an S-box having an input difference of nonzero (in the example of FIG. 4, difference=34) generates a nonlinear conversion result corresponding to the input difference of nonzero, accordingly being called an active S-box.

In the example of FIG. 4, the output difference (b7) of one active S-box (S1) to which the input difference (34) of nonzero is inputted is generated. The other inactive S-boxes S2-S8 generate output differences (00) based on the input differences (00) of zeros, respectively, and provided them as difference inputs of the linear conversion section.

(State 2)

An output difference from an S-box having an input difference of nonzero to round i (hereinafter called active S-box) is diffused in the linear conversion layer, and is outputted from the F-function (output value=$\Delta Y_i$), becoming an input difference $\Delta X_{i+i}$ to the next round, as it is.

Figure 5:
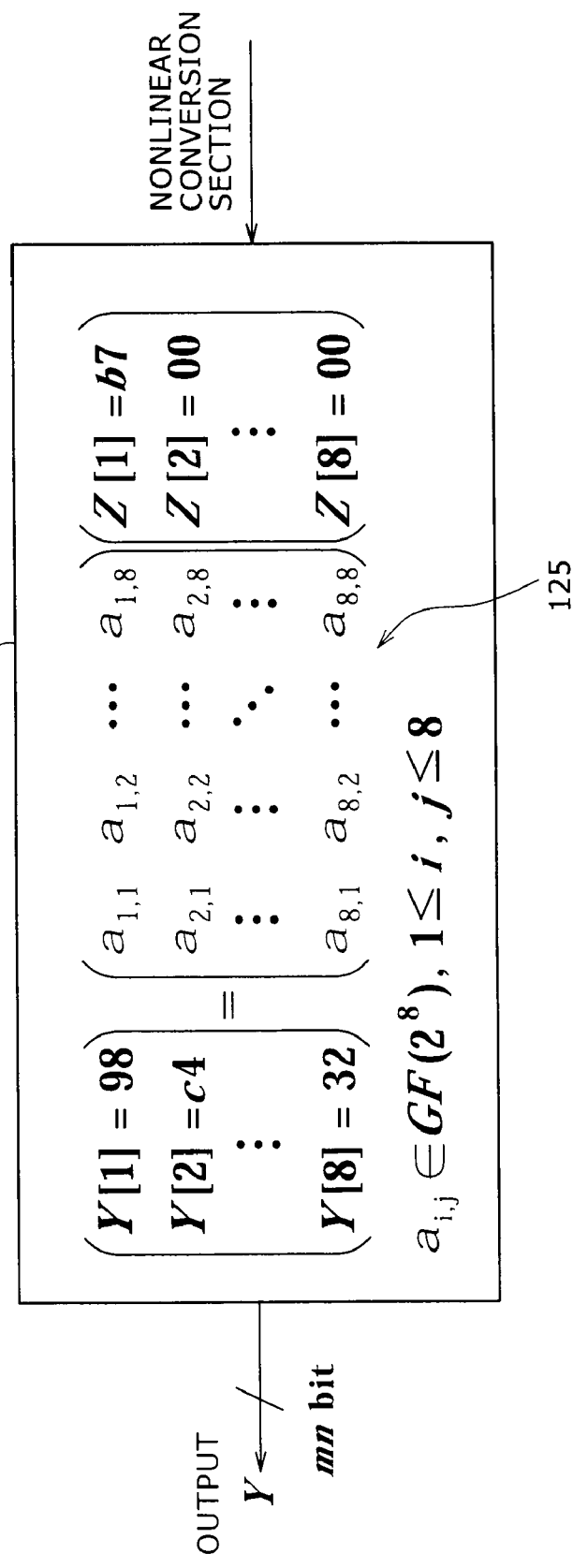
FIG. 5 is a diagram explaining a concrete example of generating an F-function output difference $\Delta Y_i$ by performing linear conversion with a square MDS matrix.

The linear conversion in the example of FIG. 4 is such that linear conversion with the certain specific square matrix 125, for example, as shown in FIG. 5, common in the F-functions of respective rounds is executed to output a difference $\Delta Y_i$= (98, c4, b4, d3, ac, 72, 0f, 32) as an output difference of an F-function of round i. As can be understood from linear conversion structure shown in FIG. 5, the output difference $\Delta Y_i$=(98, c4, b4, d3, ac, 72, 0f, 32) is determined as a value only dependent on an output element Z[1]=b7 from one active S-box (S1).

This $\Delta Y_i$=(98, c4, b4, d3, ac, 72, 0f, 32) as F-function output differences of this round i together with input differences of all zeros ($\Delta X_{i-1}$=(00, 00, 00, 00, 00, 00, 00, 00)) are subjected to the exclusive-OR (XOR) operation in an exclusive-OR section 131 shown in FIG. 4, and an operation result is given as $\Delta X_{i+1}$ to the next round i+1.

Since results of the exclusive-OR (XOR) operations on $\Delta Y_i$=(98, c4, b4, d3, ac, 72, 0f, 32), as F-function output differences of round i, and input differences of all zeros $\Delta X_{i-1}$=(00, 00, 00, 00, 00, 00, 00, 00) are $\Delta Y_i$, the input differences $\Delta X_{i+1}$ to the next round i+1 become equal to $\Delta Y_i$=(98, c4, b4, d3, ac, 72, 0f, 32).

(State 3)

An output difference $\Delta Y_{i+1}$ from an F-function of round i+1 has a nonzero value only in a position of the active S-box in round i. This data state indicates that by setting up many difference inputs data, such a data state can be obtained.

That is, $\Delta Y_{i+1}$=(ad, 00, 00, 00, 00, 00, 00, 00), and the output difference $\Delta Y_{i+1}$ has a nonzero value only in a position of the S-box (first S-box (S1)) that has a nonzero difference value, similarly with round i. Incidentally, it is clear that ad≠00.

(State 4)

In the case where an output difference of an active S-box (S1) in round i+2 agrees with an output difference of an active S-box (S1) in round i, as shown in FIG. 4, an output difference of the active S-box (S1) in round i+2 becomes b7 and agrees with the output difference (b7) of the active S-box (S1). This data state indicates that by setting up many difference inputs data, such a data state can be obtained.

When this data state occurs, the output difference $\Delta Y_{i+2}$= (98, c4, b4, d3, ac, 72, 0f, 32) of an F-function of round i+2 will agrees with the output difference $\Delta Y_i$=(98, c4, b4, d3, ac, 72, 0f, 32) of the F-function of round i which is a previous round but one round.

As a result, an exclusive-OR section 133 will execute the exclusive-OR operation on $\Delta X_{i+1}$=$\Delta Y_i$=(98, c4, b4, d3, ac, 72, 0f, 32) and $\Delta Y_{i+2}$=(98, c4, b4, d3, ac, 72, 0f, 32), which are both the same value, and will output values of all zeros as a result of the exclusive-OR operation.

As a result, the left input difference $\Delta X_{i+3}$ from the preceding stage (round i+2) that yields the output difference to the next stage (round i+3) becomes $\Delta X_{i+3}$=(00, 00, 00, 00, 00, 00, 00, 00).

The left input $\Delta X_{i+3}$=(00, 00, 00, 00, 00, 00, 00, 00) to this round i+3 consists of all zeros as with the left input difference $\Delta X_{i-1}$=(00, 00, 00, 00, 00, 00, 00, 00) to round i, and there is the possibility that the same processing as of rounds to i+2 are repeated also in round i+3 and later rounds.

As a result, there is arisen a problem that the number of active S-boxes will not increase in comparison to an increase of round number, and robustness to differential cryptanalysis attacks will not be enhanced so much.

In the common-key-block cipher, a minimum number of active S-boxes in the whole of the cryptographic function is known as one of robustness indexes to the differential cryptanalysis attack. Lager the minimum number of active S-boxes, higher the resistance to differential cryptanalysis attacks is determined to be.

As described above, the differential analysis (differential cryptanalysis attack) is a technique of analyzing an application key in each round function by setting up many inputs data (plaintexts) with a certain difference and their outputs data (ciphertexts) and analyzing this correspondence. If the number of active S-boxes can be reduced in this differential analysis, the analysis will become easy and the number of analysis processes will be able to be reduced.

Although the example referring to the above-mentioned FIG. 4, an occurrence state of a pattern where only a first S-box (S1) is an active S-box, for other S-boxes (S2-S8), a setting in which each S-box is set to be an active box is possible by setting up input data of the differential analysis. Therefore, by carrying out a differential analysis process like this, it become possible to analyze nonlinear conversion processing of each S-box, and further analyze a round key inputted for the F-function.

In order to increase the resistance to differential analysis like this, it is necessary to maintain a state where the number of active S-boxes is always large, that is, that the minimum number of active S-boxes is large.

In the example explained with reference to FIG. 4, in the case of the F-function to which an input is given in a direction from the right to the left, that is, when considering only round and round i+2 as object rounds of active S-box calculation processing, the number of active S-boxes is only two, in the F-functions to which inputs are given in a direction from the left to the right, the number of active S-boxes in round i+1 is eight, but the number of active S-boxes becomes zero by the simultaneous difference cancellation, and consequently analysis processing of nonlinear conversion processing of each S-box by the differential analysis becomes easy.

The common-key-block cryptographic algorithm shown in FIG. 4 is that the linear conversion matrices applied in the linear conversion sections in respective rounds are equal, and this particular configuration leads to the possibility that the simultaneous difference cancellation is caused by only two active S-boxes, especially in the F-functions to which an input is given in a direction from the right to the left. Therefore, there is a problem that the minimum number of active S-boxes does not fully increase in comparison with growth of the round number, and the robustness to differential cryptanalysis attacks does not increase so much.

Next, similarly, in the configuration in which the same linear conversion matrix is used for the F-functions of all the stages (rounds), an occurrence mechanism of the simultaneous difference cancellation over five rounds will be explained with reference to FIG. 6.

Figure 6:
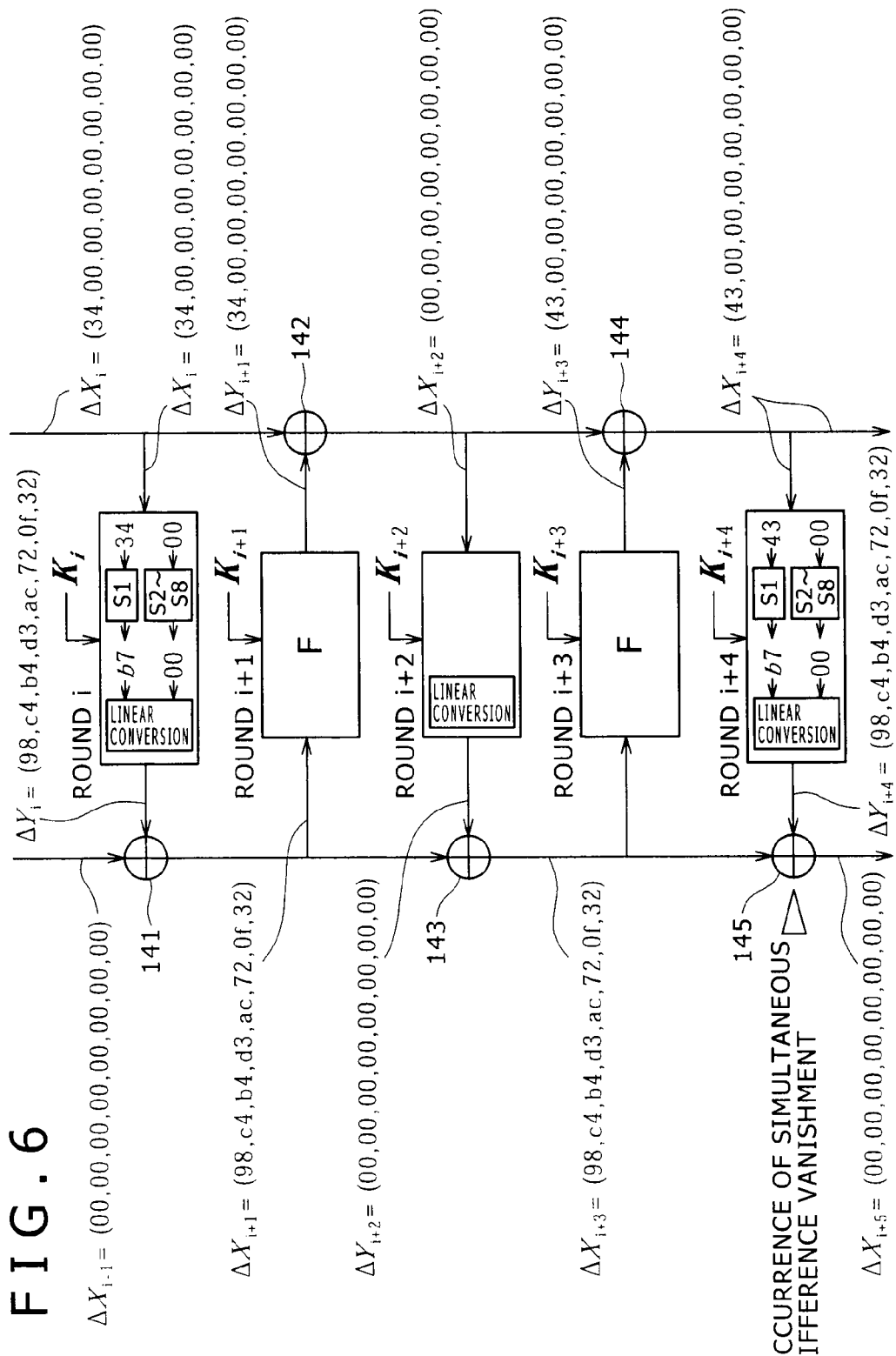
FIG. 6 is a diagram explaining the simultaneous difference cancellation of five stages in a 128-bit block cipher of m=8 and n=8.

FIG. 6 is a diagram explaining the simultaneous difference cancellation of five stages in a 128-bit block cipher of m=8 and n=8. Note that, in the figure, 64 bit data shall be represented as vectors by dividing it for a byte and each element shall be represented in hexadecimal.

The simultaneous difference cancellation in the F-function with a five-stage configuration occurs, for example, based on the following setting mechanism of the data states 1-7. The data state generated by a mechanism explained below is a data state that can be generated by setting up many difference inputs data, and the data state may be generated in analyzing a key (round key) in the so-called differential analysis.

(State 1)

Let a left half of input differences to round i consists of input differences of all zeros ($\Delta X_{i-1}$=(00, 00, 00, 00, 00, 00, 00, 00)) and a right half of input differences consists of input differences of all zeros except for an input to only one S-box ($\Delta X_i$=(34, 00, 00, 00, 00, 00, 00, 00)). This data state indicates that by setting up many difference inputs data, such a data state can be obtained in round i.

Eight elements of $\Delta X_i$=(34, 00, 00, 00, 00, 00, 00, 00) correspond to respective input differences to m (m=8) S-boxes configured in the F-functions. (34) is inputted into a first S-box ((S1) in FIG. 6), and (00)'s are input differences to the second to eighth boxes.

As described above, any S-box output difference having an input difference of zero (00) is zero (00). As far as the output difference is concerned, the S-box having an input difference of zero does not execute any operation, accordingly being called an S-box that is not active, namely an inactive S-box. On the other hand, since only an S-box (S1) with an input difference of nonzero (in the example of FIG. 6, difference=34) generates a nonlinear conversion result corresponding to the input difference of nonzero as an output difference, accordingly being called an active S-box.

In the example of FIG. 6, one active S-box (S1) to which an input difference (34) of nonzero is inputted generates an output difference (b7), and other inactive S-boxes S2-S8 generate output differences (00) based on the input differences (00) of zeros, which are assigned as difference inputs of the linear conversion section.

(State 2)

An output difference from an S-box (hereinafter called an active S-box) that has an input difference of nonzero to round (in the example of FIG. 4, difference=34) is diffused in the linear conversion layer, and outputted from the F-function (output value=$\Delta Y_i$), becoming an input difference $\Delta X_{i+1}$ to the next round, as it is.

In the example of FIG. 6, the linear conversion is executed with the certain specific square matrix 125 that is common to every round, for example, what is shown in FIG. 5, and $\Delta Y_i$=(98, c4, b4, d3, ac, 72, 0f, 32) as an F-function output difference of round i is s outputted.

$\Delta Y_i$=(98, c4, b4, d3, ac, 72, 0f, 32), as F-function output differences of round i, is subjected to the exclusive-OR (XOR) operations in the exclusive-OR section 141 shown in FIG. 6 together with input differences of all zeros ($\Delta X_{i-1}$= (00, 00, 00, 00, 00, 00, 00, 00)), and operation results become input differences to the next round i+1.

Since results of the exclusive-OR (XOR) operations on $\Delta Y_i$=(98, c4, b4, d3, ac, 72, 0f, 32), as F-function output differences of round i, and input differences of all zeros ($\Delta X_{i-1}$=(00, 00, 00, 00, 00, 00, 00, 00)) are $\Delta Y_i$, input differences to the next round i+1 become $\Delta X_{i+1}$=$\Delta Y_i$=(98, c4, b4, d3, ac, 72, 0f, 32).

(State 3)

An output difference $\Delta Y_{i+1}$ from the F-function of round i+1 has a nonzero value only in a position of the active S-box in round i. This data state indicates that by setting up many difference inputs data, such a data state can be obtained.

That is, $\Delta Y_i+_1$ is $\Delta Y_{i+1}$=(34, 00, 00, 00, 00, 00, 00, 00), and has a nonzero value only in a position of the S-box (a first S-box (S1)) that has a difference value of nonzero (in the example of FIG. 6, difference=34) as with round i.

(State 4)

An input to the F-function of round i+2 is a result of the exclusive-OR operation in the exclusive-OR section 142 on $\Delta X_i$=(34, 00, 00, 00, 00, 00, 00, 00) and $\Delta Y_{i+1}$=(34, 00, 00, 00, 00, 00, 00, 00), which are both the same data, and becomes an input consisting of all zeros, $\Delta X_{i+2}$=(00, 00, 00, 00, 00, 00, 00, 00). As a result, an output difference from the F-function of round i+2 also becomes an output difference consisting of all zeros, $\Delta Y_{i+2}$=(00, 00, 00, 00, 00, 00, 00, 00).

(State 5)

Inputs to an F-function of round i+3 are results of the exclusive-OR operations in the exclusive-OR section 143 on $\Delta X_{i+1}$=(98, c4, b4, d3, ac, 72, 0f, 32) and $\Delta Y_{i+2}$=(00, 00, 00, 00, 00, 00, 00, 00) that are F-function output differences of round i+2 of all zeros, and become inputs $\Delta X_{i+3}$=$\Delta X_{i+1}$=(98, c4, b4, d3, ac, 72, 0f, 32) to the F-function of round i+3.

(State 6)

F-function output differences of round i+3 become $\Delta Y_{i+3}$=(43, 00, 00, 00, 00, 00, 00, 00). The exclusive-OR operations in the exclusive-OR section 144 on these differences together with $\Delta X_{i+2}$=(00, 00, 00, 00, 00, 00, 00, 00) consisting of all zeros result in $\Delta X_{i+4}$=$\Delta Y_{i+3}$=(43, 00, 00, 00, 00, 00, 00, 00), which become F-function input differences of round i+4.

(State 7)

When an output difference of an active S-box (S1) in round i+4 agrees with an output difference of the active S-box (S1) in round i, an output difference of the active S-box (S1) in round i+4 becomes b7, as shown in FIG. 6, and agree with an output difference (b7) of the active S-box (S1) in round i. This data state indicates that by setting up many difference inputs data, such a data state can be obtained.

When this data state occurs, the output difference $\Delta Y_{i+4}$= (98, c4, b4, d3, ac, 72, 0f, 32) of an F-function of round i+4 will agree with the output difference $\Delta X_{i+3}$=(98, c4, b4, d3, ac, 72, 0f, 32) of the exclusive-OR section 143 of round i+2 that is a previous round but one.

As a result, in the exclusive-OR section 145, $\Delta X_{i+3}$=(98, c4, b4, d3, ac, 72, 0f, 32) and $\Delta Y_{i+4}$=(98, c4, b4, d3, ac, 72, 0f, 32), which are both the same value, will be subjected to the exclusive-OR operation, outputting values of all zeros as a result of the exclusive-OR operation.

Accordingly, input differences to the next stage (round i+5) are set up as $\Delta X_{1+5}$=(00, 00, 00, 00, 00, 00, 00, 00).

This left input to this round i+5, $\Delta X_{i+5}$=(00, 00, 00, 00, 00, 00, 00, 00) consists of all zeros as with the left input to round i, $\Delta X_{i-1}$=(00, 00, 00, 00, 00, 00, 00, 00), and there is the possibility that the same processing as of round i to round i+4 will be repeated also in round i+5 and later rounds.

Consequently, a problem that the number of active S-boxes does not increase in comparison with the increase of round number, and the robustness to differential cryptanalysis attacks does not increase so much.

As described above, the differential analysis (differential cryptanalysis attack) is a technique of analyzing an application key in each round function by setting up many inputs data (plaintext) having a certain difference and its output data (ciphertext) and analyzing this correspondence. In this differential analysis, if the number of active S-boxes can be reduced, the analysis will become easy and the number of analysis processes will be able to be curtailed.

In the example referring to FIG. 6 described above, in the case of the F-functions to which inputs are given in a direction from the right to the left, that is, in the case where round i, round i+2, and round i+4 are considered as target rounds of active S-box calculation, the number of active S-boxes is only two, a sum of round i=1, round i+2=0, and round i+4=1. In the case of the F-functions to which inputs are given in a direction from the left to the right, that is, in the case where round i+1 and round i+3 are considered as target rounds, although the number of active S-boxes is eight, the number of active S-boxes in round i+5 becomes zero because of the simultaneous difference cancellation; therefore, analysis of nonlinear conversion processing of each S-box by differential analysis and cryptanalysis processing of an input round key for the F-function become comparatively easy.

Although the example referring to FIG. 6 presents an occurrence state of a pattern where only the first S-box (S1) is an active S-box, regarding other S-boxes (S2 to S8), setting the input data of differential analysis enables any one of the other S-boxes to be set as an active S-box, therefore, execution of such a differential analysis process will make it possible to analyze nonlinear conversion processing of each S-box and further analyze the round key inputted into the F-function.

Figure 7:
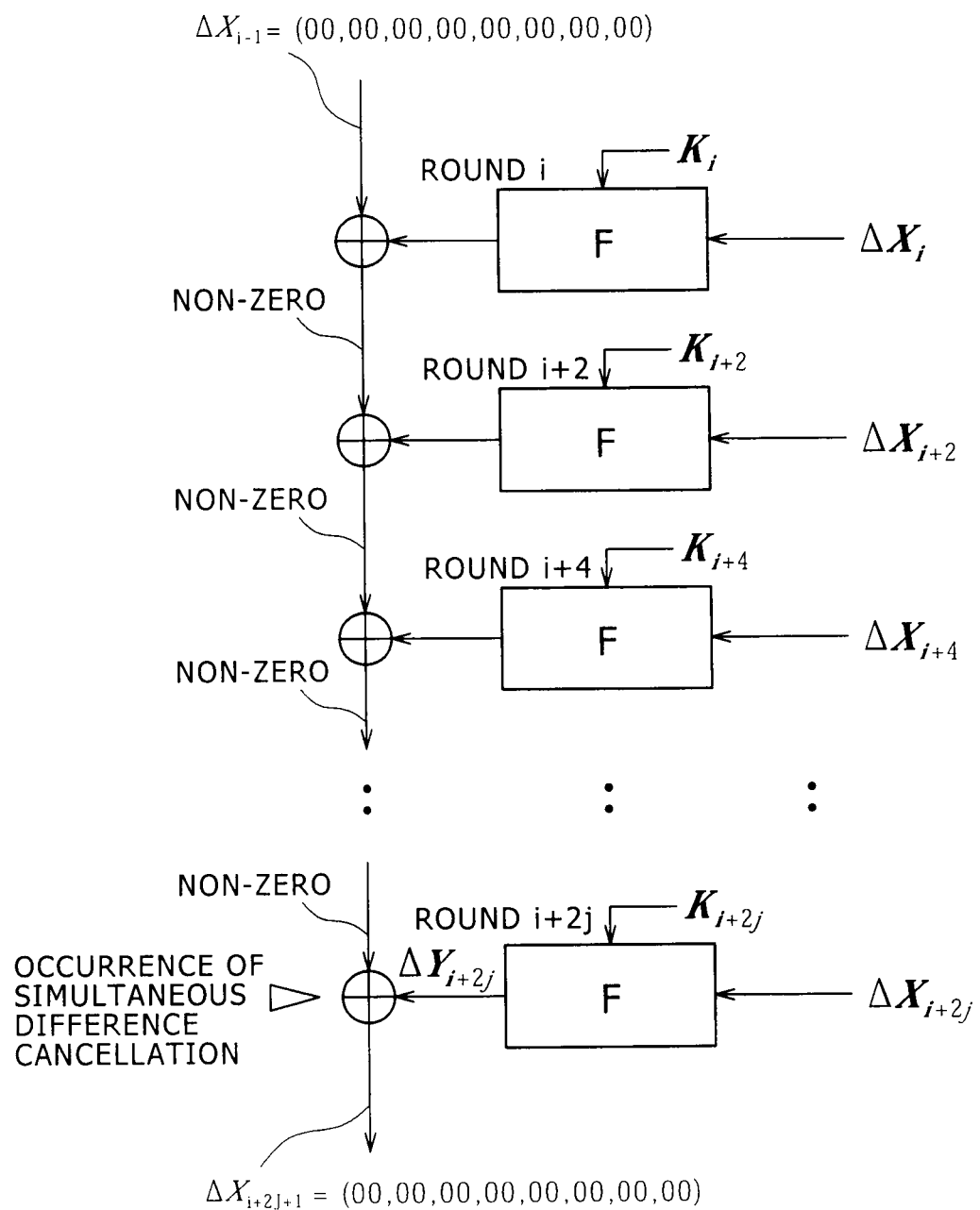
FIG. 7 is a diagram explaining a definition of the simultaneous difference cancellation of arbitrary stage in common-key-block cryptographic processing.

Although the example of occurrence of the simultaneous difference cancellation in the cases of three and five rounds was explained with reference to FIG. 4 and FIG. 6, if these cases are generalized for arbitrary round number to define the simultaneous difference cancellation, the definition can be given as follows. With reference to FIG. 7, the definition of the simultaneous difference cancellation in an arbitrary round number will be explained. FIG. 7 shows serial rounds but one (i, i+2, i+4, i+2j) of the Feistel structure that performs the common-key-block cryptographic processing of the Feistel structure.

DEFINITION

In a process where a half of the input differences of the Feistel structure in round i consists of zeros (in FIG. 7, $\Delta X_i$= (00, 00, 00, 00, 00, 00, 00, 00)) and each of them and each of output differences of the F-function of round i+2j are subjected to the exclusive-OR operation in the exclusive-OR section, a case where results of the exclusive-OR operation become zeros (in FIG. 7, $\Delta X_{i+2j+i}$=(00, 00, 00, 00, 00, 00, 00, 00)) is called the simultaneous difference cancellation.

At this time, active S-boxes existing in the F-functions of rounds i, i+2, i+4, i+2k are called active S-boxes that cause the simultaneous difference cancellation. Defining the number of nonzero elements of a vector A as Hamming Weight hw(A), the number "a" of active S-boxes that cause the simultaneous difference cancellation can be expressed by the following equation.

$$a = \sum_{j=0}^{k} hw(\Delta X_{i+2j})$$ [Equation 1]

In the examples of three rounds and five rounds described above, the number of active S-boxes that cause the simultaneous difference cancellation is both two, that is, a=2.

As described above, one of robustness indexes to differential cryptanalysis attacks in the common-key-block cipher is the minimum number of active S-boxes in the whole of the cryptographic functions, and it is determined that larger the minimum number of active S-boxes, higher the resistance to differential cryptanalysis attacks becomes.

However, in the configuration where the same linear conversion matrix is used for the F-functions of all stages as in the DES algorithm, there is the possibility that only two active S-boxes cause the simultaneous difference cancellation, as can be understood from explanation with reference to FIG. 4 and FIG. 6. There is a problem that because of presence of such a property, the minimum number of active S-boxes does not increase sufficiently and the robustness to differential cryptanalysis attacks is not strengthened so much.

[2. Linear Analysis Processing in Common-Key-Block Cryptographic Algorithm]

The differential analysis processing, as described above, requires an executor of the analysis to prepare input data (plaintext) having a constant difference and analyze its corresponding output data (ciphertext). For linear analysis processing, it is not necessary to prepare input data (plaintext) having a constant difference and analysis is executed based on input data (plaintext) whose amount is equal to or more than a predetermined amount and its corresponding output data (ciphertext).

As described above, in the common-key-block cryptographic algorithm, S-boxes as the nonlinear conversion section are prepared and there is no linear relation between the input data (plaintext) and its corresponding output data (ciphertext). In the linear analysis, the analysis is carried out by linearly approximating input/output of this S-box, analyzing a linear relation between many inputs data (plaintext) and constituent bit values of the corresponding output data (ciphertext), and narrowing down keys that are assumed candidates. In the linear analysis, it is not necessary to prepare input data with a specific difference, and analysis becomes possible only by preparing a large number of plaintexts and their corresponding ciphertexts.

[3. Cryptographic Algorithm Based on this Invention]

Hereafter, a cryptographic algorithm of this invention will be explained. The cryptographic algorithm of this invention has a structure that improves the resistance to linear cryptanalysis attacks, differential cryptanalysis attacks described above, and the like, that is, having a structure that improves the difficulty in key analysis and enhances the security.

One of features of the cryptographic algorithm concerning this invention is that the algorithm is constructed by setting up a plurality of different square MDS (Maximum Distance Separable) matrices rather than a structure in which common processing (conversion matrix) is applied to the linear conversion section of an F-function of each round as with the conventional DES algorithm. Specifically, the algorithm is configured to perform linear conversion processing applying square MDS matrices that are different at least in the consecutive even-numbered rounds and in the consecutive odd-numbered rounds.

The cryptographic algorithm concerning this invention implements a structure with which the simultaneous difference cancellation based on a small number of active S-boxes does not occur or is less prone to occur using properties of the square MDS (Maximum Distance Separable) matrices, so that the minimum number of active S-boxes is enlarged and the common-key-block cryptographic processing more robust to the differential cryptanalysis attack is realized. Alternatively, this invention implements a structure with which difficulty of linear analysis that is executed as a known plaintext cryptanalysis attack.

The cryptographic algorithm of this invention applies a typical common-key-block cryptographic structure that is called a Feistel structure having the SPN-type F-functions explained with reference to FIGS. 1 and 2, that is, applies a structure that converts a plaintext to a ciphertext or converts a ciphertext to a plaintext by simple repetition of the SPN-type F-function that has the nonlinear conversion section and the linear conversion section over a plurality of rounds.

For example, the length of a plaintext is assumed as 2 nm bit (here, m and n being both integers). The structure divides a plain text of 2 nm bit into two data PL (Plain-Left and Plain-Right) each of mn bits, and executes the F-function in each round using them as input values. The F-function is an F-function with an SPN-type consisting of the nonlinear conversion section composed of S-boxes and the linear conversion section connected together.

In the configuration of this invention, as a matrix for the linear conversion processing to be applied in the linear conversion section in the F-function, matrices selected from a plurality of different square MDS (Maximum Distance Separable) matrices are set up as matrices to be applied in the linear conversion sections of the F-functions of respective rounds. Specifically, square MDS matrices that are different at least in the consecutive even-numbered rounds and in the consecutive odd-numbered rounds are applied.

The square MDS matrix will be explained. The square matrix is a matrix satisfying properties of (a) and (b) below. (a) The matrix is a square matrix. (b) Determinants of all submatrices included in a matrix are not zero, namely det (submatrix)≠0.

The matrix satisfying the conditions of the above (a) and (b) is called the square MDS matrix. The lengths of input/output bits to the F-function being executed in each round of the common-key-block cryptographic processing is m×n bit (m, n: integer). FIG. 8 shows an example of the square MDS matrix in the case where the nonlinear conversion section configured in the F-function is constructed with m S-boxes each having n bit input/output, and the linear conversion section executes linear conversion processing based on m-th square matrices each having elements on the extension field $GF(2^n)$ of 2 defined by an n-th irreducible polynomial as its elements. An example of the square MDS matrix shown in FIG. 8 is an example of the square MDS matrix of n=8 and m=8.

Designating the number of nonzero elements in the vector A by Hamming weight hw (A), an m-th square MDS matrix by M, and an input vector to the square MDS matrix M by x, a square MDS matrix satisfying the above (a) and (b) satisfies the following inequality (Equation 1).

$$hw(x)+hw(M_x) \geq m+1 \qquad \text{(Equation 1)}$$

The above-mentioned expression (Equation 1) indicates that the total of the number of nonzero elements hw(x) of the input data x to be linearly converted with the square MDS matrix (M) plus the number of nonzero elements $hw(M_x)$ of the output data $M_x$ that was linearly converted with the square MDS matrix (M) is larger than the order number m of the square MDS matrix.

Incidentally, the name of the square MDS matrix is given because a right half of a standard form of a generation matrix of the square MDS-code (Maximum Distance Separable Code) satisfies the above-mentioned conditions.

It is known that, even in the conventional configuration in which a single matrix is incorporated in all the F-functions, the use of a square MDS matrix as a liner conversion matrix enables the minimum number of active S-boxes to be maintained at a comparatively high level as compared to a case where a matrix other than the square MDS matrix is used.

This invention proposes a method of using a matrix satisfying the conditions of the square MDS matrix for the F-function of each round and further setting up different matrices for respective rounds. Specifically, square MDS matrices that are different at least in the consecutive even-numbered rounds and in the consecutive odd-numbered rounds are applied.

A plurality of examples of configurations in each of which the resistance to differential cryptanalysis attacks is made higher in the Feistel-type common-key-block cipher of stage number 2r (r being an integer) will be explained below.

In the following explanation, $MLT_j$ denotes the linear conversion matrix to be applied in the linear conversion section of the F-function of the j-th stage in the Feistel-type common-key-block cryptographic structure of stage number 2r (round number).

In the configuration of this invention, as a matrix for linear conversion processing to be applied in the linear conversion section of the F-function of each stage in the Feistel-type common-key-block cryptographic structure of stage number 2r (round number), matrices selected from a plurality of different square MDS (Maximum Distance Separable) matrices are set up as matrices to be applied in the linear conversion sections of the F-functions of respective rounds. Specifically, square MDS matrices that are different at least in the consecutive even-numbered rounds and in the consecutive odd-numbered rounds are applied.

Specifically, in compliance with the Feistel-type common-key-block cryptographic structure of stage number (round number) 2r, q square MDS matrices $L_1, L_2, \ldots, L_q$ are generated (q≦r). Then, as matrices for the linear conversion processing to be applied in the linear conversion sections in the F-functions of odd-numbered stages in the Feistel-type common-key-block cryptographic structure of stage number (round number) 2r, q square MDS matrices are repeatedly set up designating $L_1, L_2, \ldots, L_q, L_1, L_2, \ldots$ from its upper stage of the F-functions. Moreover, for the F-functions of even-numbered stages, q square MDS matrices are repeatedly set up designating $L_1, L_2, \ldots, L_q, L_1, L_2, \ldots$ from its lower stage of the F-functions.

Figure 9:
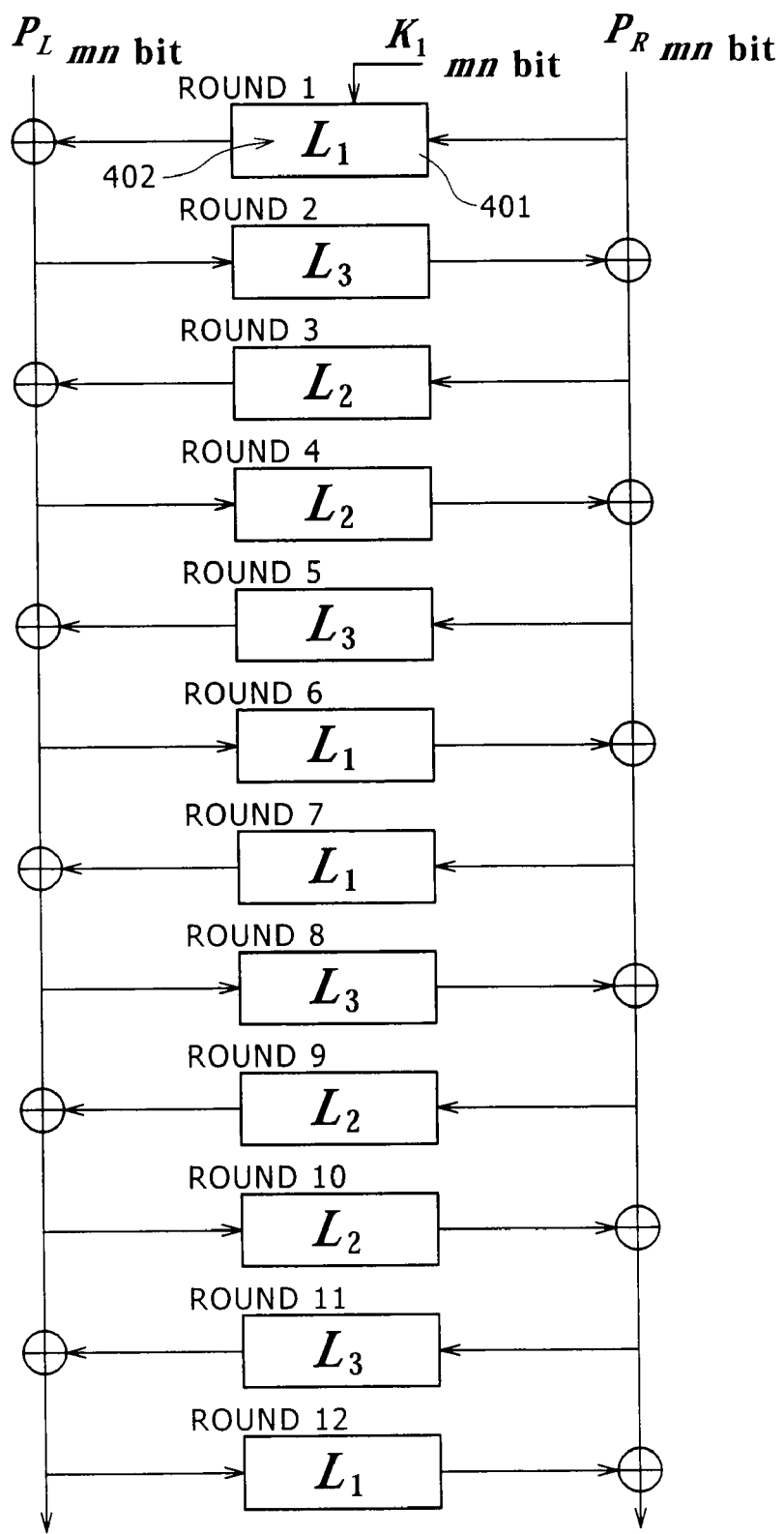
FIG. 9 is a diagram explaining a setting example of square MDS matrices as linear conversion matrices of the F-functions of respective rounds in a common-key-block cryptographic algorithm according to this invention.

FIG. 9 shows a configuration example to which this setup is applied. As a configuration example in which three kinds of different square MDS matrices are arranged in the Feistel-type common-key-block cryptographic structure of q=3, namely round number 12 in the case where a structure is defined as the Feistel-type common-key-block cryptographic structure of stage number (round number) 2r=12, namely r=6, square MDS matrices ($L_1$, $L_2$, $L_3$) to be set in the linear conversion sections of the F-functions in respective rounds are shown in FIG. 9.

The configuration of FIG. 9 is a structure that divides a plaintext of 2 nm bit into two data of PL (Plain-Left) and PR (Plain-Right) each of mn bit, and executes an F-function in each round using them as input values. The F-function of the first round as well as the F-functions of other rounds are F-functions each with the SPN type consisting of the nonlinear conversion section composed of S-boxes and the linear conversion section connected together.

The setup example of FIG. 9 is of r=6 and q=3, where a symbol $L_n$ shown in each F-function denotes a square MDS matrix 402. That is, $L_1$, $L_2$, and $L_3$ denote three kinds of mutually different square MDS matrices, each of which is a square MDS matrix to be applied to linear conversion processing in the linear conversion section of each F-function.

Figure 10:
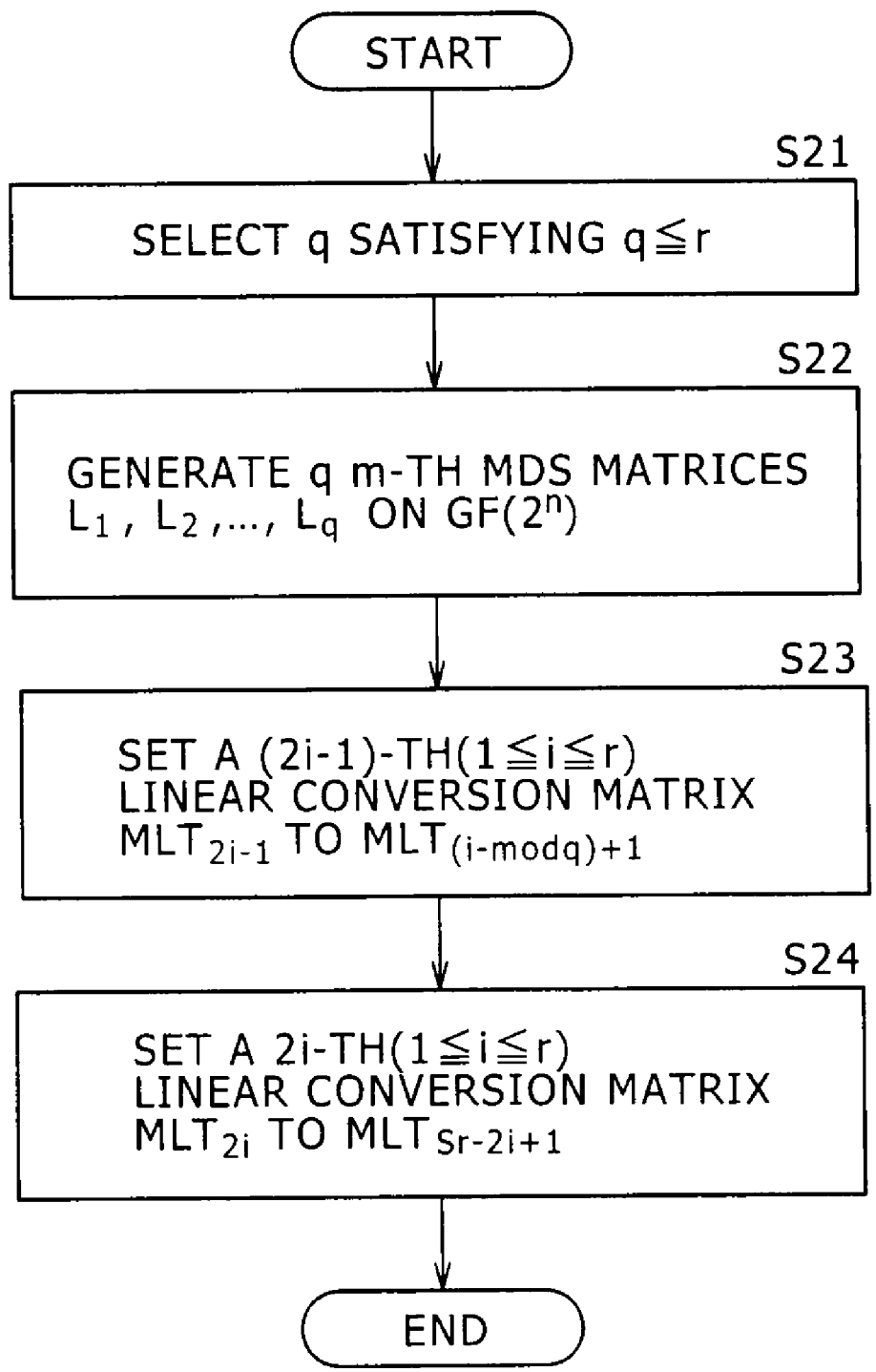
FIG. 10 is a flowchart explaining a setting processing sequence of square MDS matrices as the linear conversion matrices of the F-functions of respective rounds in the common-key-block cryptographic algorithm according to this invention.

A setup processing sequence of the linear conversion matrix $MLT_j$ will be explained with reference to FIG. 10.

[Step S21]

Number q equal to or less than a half r of the round number 2r, namely q satisfying q r is selected. Here, q is an integer of two or more.

[Step S22]

q m-th square MDS matrices $L_1$, $L_2$, ... $L_q$ on $GF(2^n)$ are generated. Details of the q m-th square MDS matrices $L_i$, $L_2$, ..., $L_q$ on $GF(2^n)$ will be explained in a later paragraph.

After the q m-th square MDS matrices $L_i$, $L_2$, $L_q$ on $GF(2^n)$ are generated in Step S22, square MDS matrix setup processing below is executed.

[Step S23]

The linear conversion matrix $MLT_{2i-1}$ of stage number 2i−1 ($1 \leq i \leq r$) is set to $L_{(i-1 \bmod q)+1}$.

[Step S24]

The linear conversion matrix $MLT_{2j}$ of stage number 2i ($1 \leq i \leq r$) is set to $MLT_{2r-2i+1}$.

For example, in the case of an example configuration shown in FIG. 9, that is, in the case where the cryptographic processing apparatus has 12 stages. (r=6) and q=3, the setting will be: $MLT_1=L_1$, $MLT_2=L_3$, $MLT_3=L_2$, $MLT_4=L_2$, $MLT_5=L_3$, $MLT_6=L_1$, $MLT_7=L_1$, $MLT_8=L_3$, $MLT_9=L_2$, $MLT_{10}=L_2$, $MLT_{11}=L_3$, $MLT_{12}=L_1$.

Thus, the cryptographic processing apparatus of this invention uses the following structure. In compliance with the Feistel-type common-key-block cryptographic structure of stage number (round number) 2r, q square MDS matrices are generated, wherein q r. For the F-functions of odd-numbered stages, q square MDS matrices are repeatedly set up designating $L_1$, $L_2$, ..., $L_q$, $L_1$, $L_2$, ... sequentially from the F-function of the upper stage, and for the F-functions of even-numbered stages, q square MDS matrices are repeatedly set up designating $L_1$, $L_2$, ..., $L_q$, $L_1$, $L_2$, ... sequentially from the F-function of the lower stage.

Next, details of the q m-th square MDS matrices $L_1$, $L_2$, ..., $L_q$ on $GF(2^n)$ in Step S22 in the processing flow of FIG. 10 and setting them to the F-functions will be explained. The explanation will be given along the following items.

(3-a) Example of generation of a square MDS matrices that realize improved resistance to differential cryptanalysis attacks and setting them to the F-functions (3-b) Example of generation of a square MDS matrices that realize improved resistance to linear cryptanalysis attacks and setting them to the F-functions (3-c) Example of generation of a square MDS matrices that realize improved resistance to differential cryptanalysis attacks and linear cryptanalysis attacks, and setting them to the F-functions.

(3-a) Example of generation of square MDS matrices that realize improved resistance to differential cryptanalysis attacks and setting them to the F-functions. First, as an example of generation of square MDS matrices that realize improved resistance to differential cryptanalysis attacks and setting them to the F-functions, three processing examples a2, a2, and a3 will be explained.

Processing Example a1

A first example of generation of square MDS matrices that realize improved resistance to differential cryptanalysis attacks and setting them to F-function will be explained. First, the explanation will be given to generation processing of a square MDS matrix with reference to a flowchart shown in FIG. 11.

[Step S101]

Figure 11:
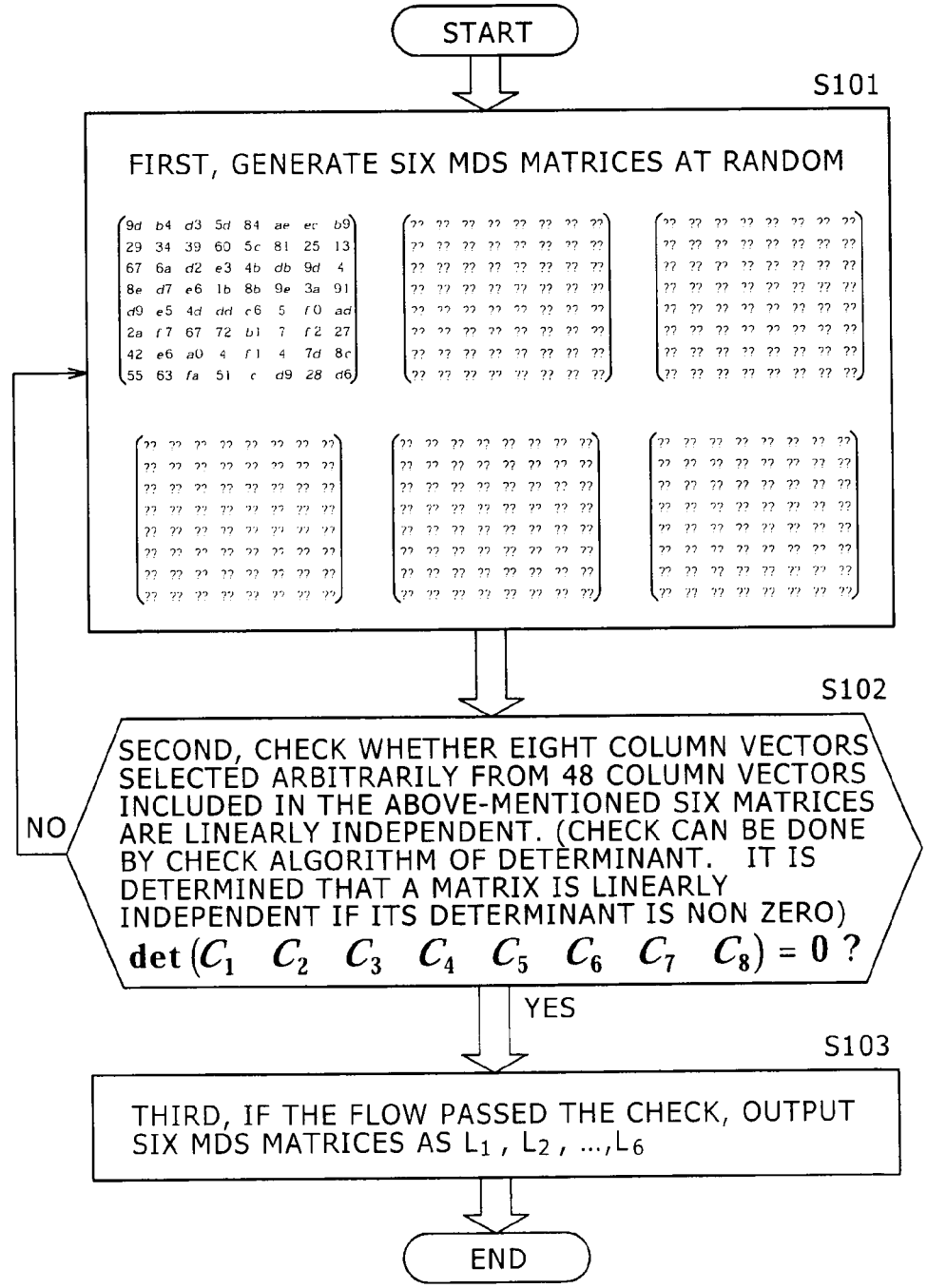
FIG. 11 is a flowchart explaining a processing example a1 of generating square MDS matrices that realize improved resistance to differential cryptanalysis attacks as a generation technique of square MDS matrices that are the linear conversion matrices to be set in the F-functions of respective rounds.

Designating input: the number of necessary square MDS matrices by q, an extension order by n, and a matrix size by m, the q m-th square MDS matrices $L_1, L_2, \ldots, L_q$ are generated at random on $GF(2^n)$. The flowchart shown in FIG. 11 shows a processing example as with the number of MDS matrices q=6, the extension order n=8, and the matrix size m=8.

[Step S102]

It is checked whether arbitrary qm column vectors taken out from qm column vectors included in the q m-th square MDS matrices $L_1, L_2, \ldots, L_q$ are linearly independent. If the flow passed the check, the flow proceeds to Step S103; if not so, the flow returns to Step S101.

[Step S103]

The q m-th square MDS matrices $L_1, L_2, \ldots, L_q$ are outputted as square MDS matrices to be applied to the Feistel-type common-key-block cipher of round number 2r.

Through the above process, the q m-th square MDS matrices $L_1, L_2, \ldots, L_q$ are generated. Here, q satisfies $q \leq r$.

The q m-th square MDS matrices $L_1, L_2, \ldots, L_q$ generated in this way are set up as matrices to be applied to the linear conversion processing in the linear conversion section of the F-function of each stage in the Feistel-type common-key-block cryptographic structure of stage number (round number) 2r, according to processing of [Step S23] and [Step S24] explained previously with reference to FIG. 10. That is, for odd-numbered stages, q square MDS matrices are designated as $L_1, L_2, \ldots, L_q, L_1, L_2, \ldots$ sequentially and repeatedly from the F-function of the upper stage, and for even-numbered stages, q square MDS matrices are designated as $L_1, L_2, \ldots, L_q, L_1, L_2, \ldots$ sequentially and repeatedly from the F-function of the lower stage.

Thus, the square MDS matrices of the even-numbered rounds and the square MDS matrices of the even-numbered rounds are arranged in mutually reverse orders, respectively, whereby it is guaranteed that encryption processing and decryption processing are the same except for processing of replacing a sequence of keys.

This configuration guarantees the following. (a) The linear conversion matrix of each F-function is a square MDS. (b) Arbitrary m column vectors from linear conversion matrices included in at least consecutive q F-functions in odd-numbered rounds in a cryptographic function are linearly independent. (c) Arbitrary m column vectors from linear conversion matrices included in at least consecutive q F-functions in even-numbered rounds therein are linearly independent. Since respects (a) to (c) are guaranteed, it is guaranteed that, in the Feistel-type common-key-block cryptographic structure having a plurality of rounds, the simultaneous difference cancellation by contribution of m or less active S-boxes does not occur. Therefore, the minimum value of the number of active S-boxes in the whole of the cryptographic function will increase.

Thus, this processing example makes it possible to enlarge the minimum number of active S-boxes in the whole of the cryptographic function that is one of robustness indexes to difference cryptanalysis attacks in the common-key-block cipher. As a result, the number of active S-boxes when the differential analysis (differential cryptanalysis attack) is tried will increase and difficulty in analysis will be enhanced. Therefore, high-security cryptographic processing whose key is difficult to analyze is realized.

Processing Example a2

A second example of generation of square MDS matrices that realize improved resistance to differential cryptanalysis attacks and setting them to the F-functions will be explained. Generation processing of the square MDS matrices will be explained with reference to the flowchart of FIG. 12.

[Step S201]

Figure 12:
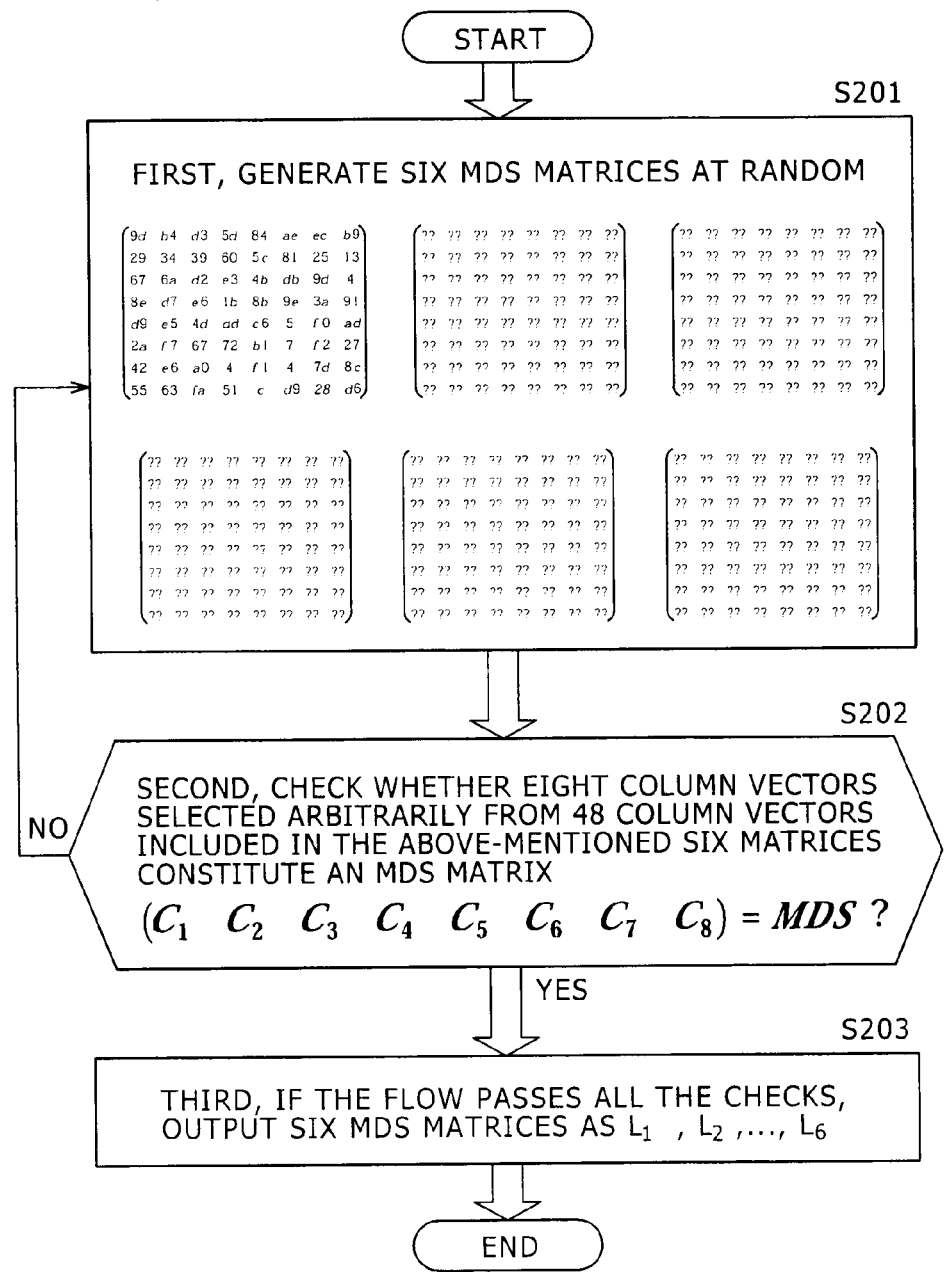
FIG. 12 is a flowchart explaining a processing example a2 of generating square MDS matrices that realize improved resistance to differential cryptanalysis attacks as a generation technique of square MDS matrices that are the linear conversion matrices to be set in the F-functions of respective rounds.

Designating input: the number of necessary MDS matrices by q, the extension order by n, and the matrix size by m, the q m-th square MDS matrices $L_1, L_2, \ldots, L_q$ are generated at random on $GF(2^n)$. The flowchart shown in FIG. 12 shows a processing example as with the number of MDS matrices q=6, the extension order n=8, and the matrix size m=8.

[Step S202]

It is checked whether a matrix composed of m column selected arbitrarily from qm columns included in the q m-th square MDS matrices $L_1, L_2, \ldots, L_q$ is a square MDS. If the flow passed the check, the flow proceeds to Step S203; if not so, the flow returns to Step S201. Here, the square MDS matrix means a matrix satisfying the following properties, as described above. (a)

It is a square matrix. (b) Determinants of all submatrices included in the matrix are not zero, that is, det(submatrix)≠0.

[Step S203]

The q m-th square MDS matrices $L_1, L_2, \ldots, L_q$ are outputted as square MDS matrices to be applied to the Feistel-type common-key-block cipher of round number 2r.

Through the above process, the q m-th square MDS matrices $L_1, L_2, \ldots, L_q$ are generated. Here, q satisfies q≦r.

In the square MDS matrix generation processing in the above-mentioned processing example a1, as explained in the processing sequence of FIG. 11, linear independence of a matrix composed of arbitrary m columns taken out from qm columns included in the q m-th square MDS matrices $L_1, L_2, \ldots, L_q$ in Step S102 was determined. In the square MDS matrix generation processing in this processing example a2, it is checked whether a matrix composed of arbitrary m columns taken out from qm columns included in the q m-th square MDS matrices $L_1, L_2, \ldots, L_q$ is a square MDS matrix. That is, severer check will be executed.

Similarly with the processing example a1 explained previously, the qm-th square MDS matrices $L_1, L_2, \ldots, L_q$ generated by square MDS matrix generation processing that followed a processing sequence shown in this FIG. 12 are set up as matrices to be applied to linear conversion processing of the linear conversion sections of the F-functions of respective stages in the Feistel-type common-key-block cryptographic structure of stage number (round number) 2r, according to processing of [Step S23] and [Step S24] explained previously with reference to FIG. 10. That is, for odd-numbered stages, q square MDS matrices are repeatedly designated as $L_1, L_2, \ldots, L_q, L_1, L_2, \ldots$ sequentially from the F-function of the upper stage, and for even-numbered stages, q square MDS matrices are repeatedly designated as $L_1, L_2, \ldots, L_q, L_1, L_2, \ldots$ sequentially from the F-function of the lower stage.

Thus, the square MDS matrices of the even-numbered rounds and the square MDS matrices of the even-numbered rounds are arranged in mutually reverse orders, respectively, whereby it is guaranteed that encryption processing and decryption processing are the same except for processing of replacing a sequence of keys.

This configuration guarantees the following:

(a) The linear conversion matrix of each F-function is a square MDS.

(b) Arbitrary m column vectors from linear conversion matrices included in at least consecutive q F-functions in odd-numbered rounds constitute a square MDS matrix.

(c) Arbitrary m column vectors from linear conversion matrices included in at least consecutive q F-functions in even-numbered rounds constitute a square MDS matrix.

Therefore, in the Feistel-type common-key-block cryptographic structure with round number of a plurality of stages, it is guaranteed that the simultaneous difference cancellation by contribution of m or less active S-boxes does not occur in the consecutive 2q−1 rounds. Further, the following is guaranteed.

(d) The number of nonzero elements in the difference values obtained by contribution of "a" (a≦m) active S-boxes becomes m+1-a or more, from the property of the square MDS matrix. Therefore, the minimum value of the number of active S-boxes in the whole of the cryptographic function increases.

Thus, by this processing example, it becomes possible to enlarge the minimum number of active S-boxes in the whole of the cryptographic function that is one of robustness indexes to differential cryptanalysis attacks in the common-key-block cipher, and as a result the number of active S-boxes in the case where differential analysis (differential cryptanalysis attack) is tried will increase and difficulty in analysis will be enhanced. Therefore, high-security cryptographic processing whose key is difficult to analyze is realized.

Processing Example a3

The third example of generation of square MDS matrices that realize improved resistance to differential cryptanalysis attacks and setting them to the F-functions will be explained. Generation processing of square MDS matrices will be explained with reference to the flowchart of FIG. 13.

[Step S301]

Designating input: the number of necessary MDS matrices by q, the extension order by n, and the matrix size by m, one qm-th square MDS matrix is generated on $GF(2^n)$. The flowchart shown in FIG. 1 shows a processing example as with the number of MDS matrices q=6, the extension order n=8, and the matrix size m=8.

[Step S302]

m rows are selected and extracted arbitrarily from the one qm-th square MDS matrix M and a matrix M' of m-rows and qm-columns is composed.

[Step S303]

The qm column vectors included in the matrix M' of m-rows and qm-column is arbitrarily divided into q groups each consisting of m column vectors without presence of any one column vector in two or more groups. m-th square matrices $L_1, L_2, \ldots, L_q$ are outputted from the column vectors included in the respective groups as square MDS matrices to be applied to the Feistel-type common-key-block cipher of round number 2r.

Through the above process, the q m-th square MDS matrices $L_1, L_2, \ldots, L_q$ are generated. Here, q satisfies q r.

The square MDS matrix generation technique 3 in the processing example a3 will be explained more concretely with reference to FIG. 14.

[Step S301]

One qm-th square MDS matrix M is generated on $GF(2^n)$. As shown in FIG. 14, a square MDS matrix M of qm×qm is generated. Note that the order of the matrix M generated in this step S301 may be larger than qm (order).

[Step S302]

Figure 14:
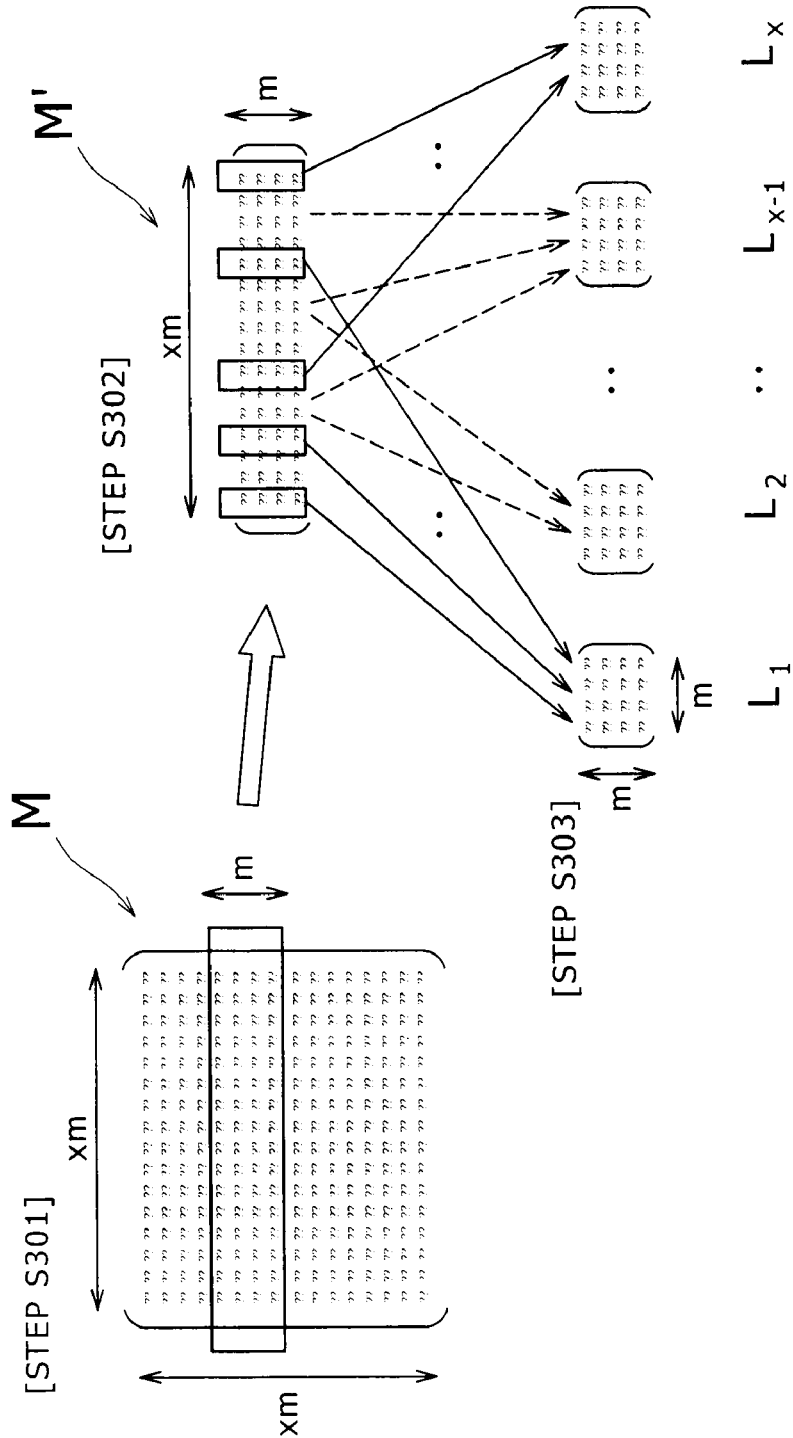
FIG. 14 is a diagram explaining a concrete technique of the processing example a3 of generating square MDS matrices that are the linear conversion matrices to be set in the F-functions of respective rounds.

As shown in FIG. 14, m columns selected and extracted arbitrarily from the qm-th square MDS matrix M and a matrix M' of m rows and qm columns is composed. Note that although the example in the figure is shown as an example in which consecutive m rows are selected and extracted, a matrix M' of m rows and qm columns may be composed by selecting and extracting arbitrary m rows having a clearance between them that will constitute the m-th square MDS matrix M.

[Step S303]

qm column vectors included in the matrix M' of m rows and qm columns are divided into x groups each having m column vectors without presence of any one column vector in two or more groups, and m-th square matrices $L_1, L_2, \ldots, L_x$ are generated from the column vectors included in respective groups.

Figure 13:
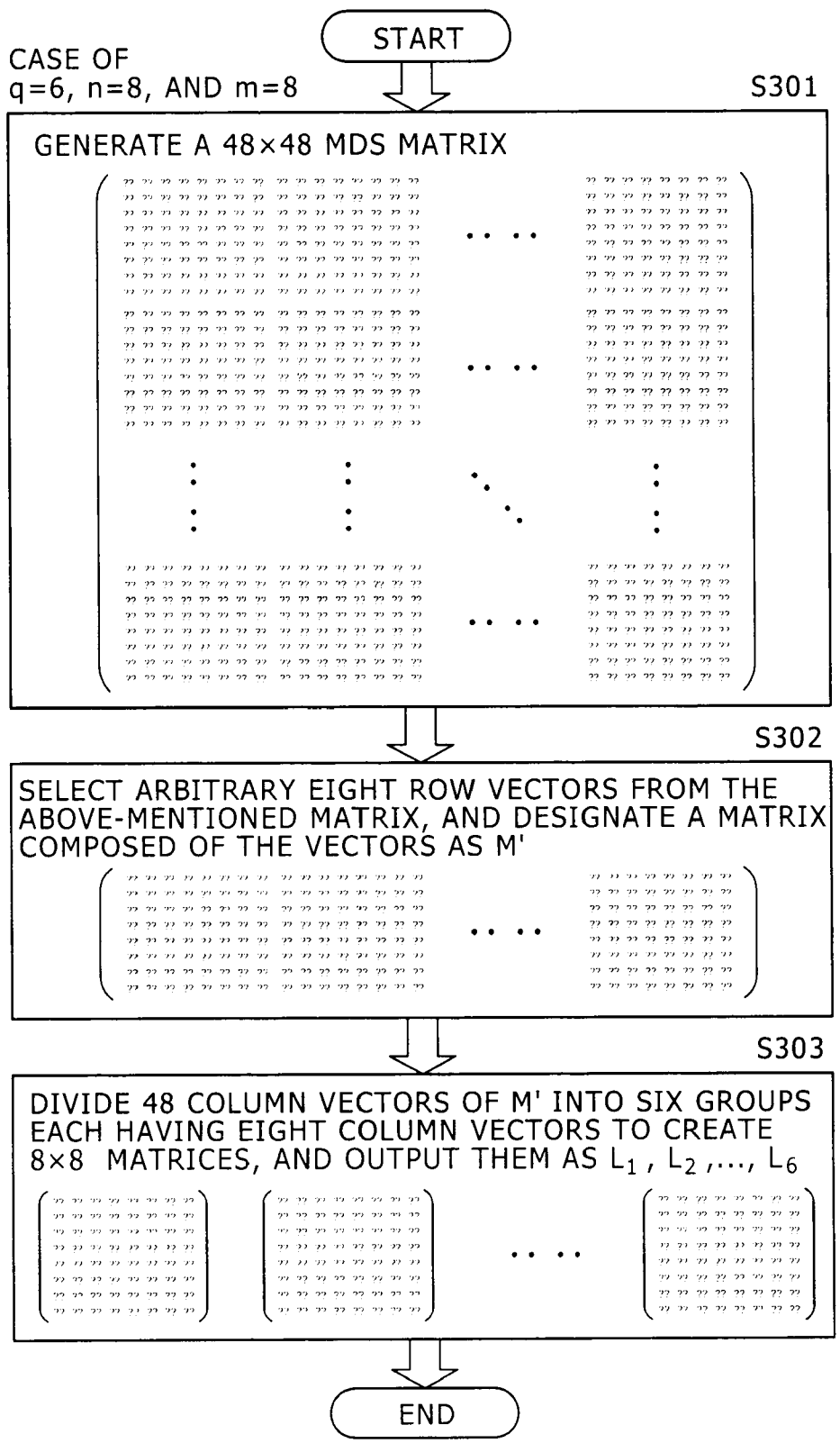
FIG. 13 is a flowchart explaining a processing example a3 of generating square MDS matrices that realize improved resistance to differential cryptanalysis attacks as a generation technique of square MDS matrices that are the linear conversion matrices to be set in the F-functions of respective rounds.

Like the processing examples a1 and a2 explained previously, the q m-th square MDS matrices $L_1, L_2, \ldots, L_q$ generated by square MDS matrix generation processing that followed a processing sequence explained with reference to FIGS. 13 and 14 are set up as matrices to be applied to linear conversion processing of the linear conversion sections of the F-functions of respective stages in the Feistel-type common-key-block cryptographic structure of stage number (round number) 2r, according to processing of [Step S23] and [Step S24] explained previously with reference to FIG. 10. That is, for odd-numbered stages, q square MDS matrices are repeatedly designated as $L_1, L_2, \ldots, L_q, L_1, L_2, \ldots$ sequentially from the F-function of the upper stage, and for even-numbered stages, q square MDS matrices are repeatedly designated as $L_1, L_2, \ldots, L_q, L_1, L_2, \ldots$ sequentially from the F-function of the lower stage.

Thus, the square MDS matrices of the even-numbered rounds and the square MDS matrices of the even-numbered rounds are arranged in mutually reverse orders, respectively, whereby it is guaranteed that encryption processing and decryption processing are the same except for processing of replacing a sequence of keys.

This configuration guarantees the following. (a) The linear conversion matrix of each F-function is a square MDS matrix. (b) Arbitrary m column vectors of the linear conversion matrix included in at least consecutive q F-functions in the odd-numbered rounds in the cryptographic function are linearly independent. (c) Arbitrary m column vectors of the linear conversion matrix included in at least consecutive q F-functions in the even-numbered rounds therein are linearly independent. Since these respects (a) to (c) are guaranteed, it is guaranteed that the simultaneous difference cancellation by contribution of m or less active S-boxes does not occur in the consecutive 2q−1 rounds in the Feistel-type common-key-block cryptographic structure with round number of a plurality of stages. Further, the following is guaranteed. (d) From the property of the square MDS matrix, the number of non-zero elements in the difference values obtained by contribution of "a" (a≦m) active S-boxes becomes m+1−a or more. Therefore, the minimum value of the number of active S-boxes in the whole of the cryptographic function increases.

A case where the processing example a3 especially produces an effect is a case where m and r become large, a time cost required in a matrix determination processing system of the above-mentioned processing examples a1 and a2 become enormous, and thereby it is difficult to determine a matrix within a realistic time. Even in such a case, if using the square MDS matrix generation technique of this processing example a3, matrix generation processing in a comparatively short time will become possible.

This is because it becomes possible in the processing example a3 to apply a system capable of processing for large m and r sufficiently in a realistic time, for example, a generation method for generating a matrix with the Reed-Solomon code.

Also in this processing example a3, as described above, it become possible to enlarge the minimum number of active S-boxes in the whole of the cryptographic function that is one of robustness indexes to differential cryptanalysis attacks in the common-key-block cipher. As a result, when differential analysis (differential cryptanalysis attack) is tried, the number of active S-boxes increases, which will enhance difficulty in analysis. Therefore, high-security cryptographic processing whose key is difficult to analyze is realized.

[(3-b) Example of Generation of Square MDS Matrices that Realize Improved Resistance to Linear Cryptanalysis Attacks and Setting Them to the F-Functions]

Next, two processing examples b1, b2 will be explained as examples of generation of the square MDS matrices that realize improved resistance to linear cryptanalysis attacks, and setting them to the F-functions.

Processing Example B1

A first example of generation of the square MDS matrices that realize improved resistance to linear cryptanalysis attacks and setting them to the F-functions will be explained. Generation processing of the square MDS matrices will be explained with reference to the flowchart shown in FIG. 15.

[Step S401]

Designating input: the number of necessary square MDS matrices by q, the extension order by n, and the matrix size by m, the q m-th square MDS matrices $M_1, M_2, \ldots, M_g$ are generated at random on $GF(2^n)$. The flowchart shown in FIG. 14 shows a processing example as with the number of square MDS matrices q=6, the extension order n=8, and the matrix size m=8.

[Step S402]

It is checked whether arbitrary m row vectors taken out from 2m row vectors included in two adjacent inverse matrices after calculating inverse matrices $M_1^{-1}, M_2^{-1}, \ldots, M_q^{-1}$, of q m-th square MDS matrices $M_1, M_2, \ldots,$ of $M_q$ are linearly independent. $t^R$ in FIG. 15 denotes a transposed vector of a row vector. If the flow passed the check, the flow proceeds to Step S403; if not so, the flow returns to Step S401. Here, matrices $M1^{-1}, Mq^{-1}$ shall be considered as adjacent matrices.

[Step S403]

The q m-th square MDS matrices $L_1, L_2, \ldots, L_q$ are outputted as square MDS matrices to be applied to the Feistel-type common-key-block cipher of round number 2r.

Through the above process, the q m-th square MDS matrices $L_1, L_2, \ldots, L_q$ are generated. Here, q satisfies q r.

The q m-th square MDS matrices generated in this way $L_1, L_2, \ldots, L_q$ are set up as matrices to be applied to linear conversion processing of the linear conversion sections of the F-functions of respective stages in the Feistel-type common-key-block cryptographic structure of stage number (round number) 2r, according to processing of [Step S23] and [Step S24] explained previously with reference to FIG. 10. That is, for odd-numbered stages, q square MDS matrices are repeatedly designated as $L_1, L_2, \ldots, L_q, L_1, L_2, \ldots$ sequentially from the F-function of the upper stage, and for even-numbered stages, q square MDS matrices are repeatedly designated as $L_1, L_2, \ldots, L_q, L_1, L_2, \ldots$ sequentially from the F-function of the lower stage.

The square MDS matrices of the even-numbered rounds and the square MDS matrices of the even-numbered rounds are arranged in mutually reverse orders, respectively, in this way, whereby it is guaranteed that encryption processing and decryption processing are the same except for replacing a sequence of keys.

This configuration guarantees the following. (a) A linear conversion matrix of each F-function is a square MDS, (b) m column vectors in an inverse matrix included consecutively in odd-numbered rounds in a cryptographic function and in an inverse matrix included consecutively in even-numbered rounds therein are linearly independent. These properties enables the difficulty in analysis by linear approximation in linear cryptanalysis attacks to be increased, and high-security cryptographic processing with increased difficulty in analysis, that is, whose key is difficult to analyze is realized.

Processing Example B2

A second example of generation of the square MDS matrices that realize improved resistance to linear cryptanalysis attacks and setting them to the F-functions will be explained. The explanation will be given for generation processing of the square MDS matrix referring to the flowchart shown in FIG. 16.

[Step S501]

Figure 16:
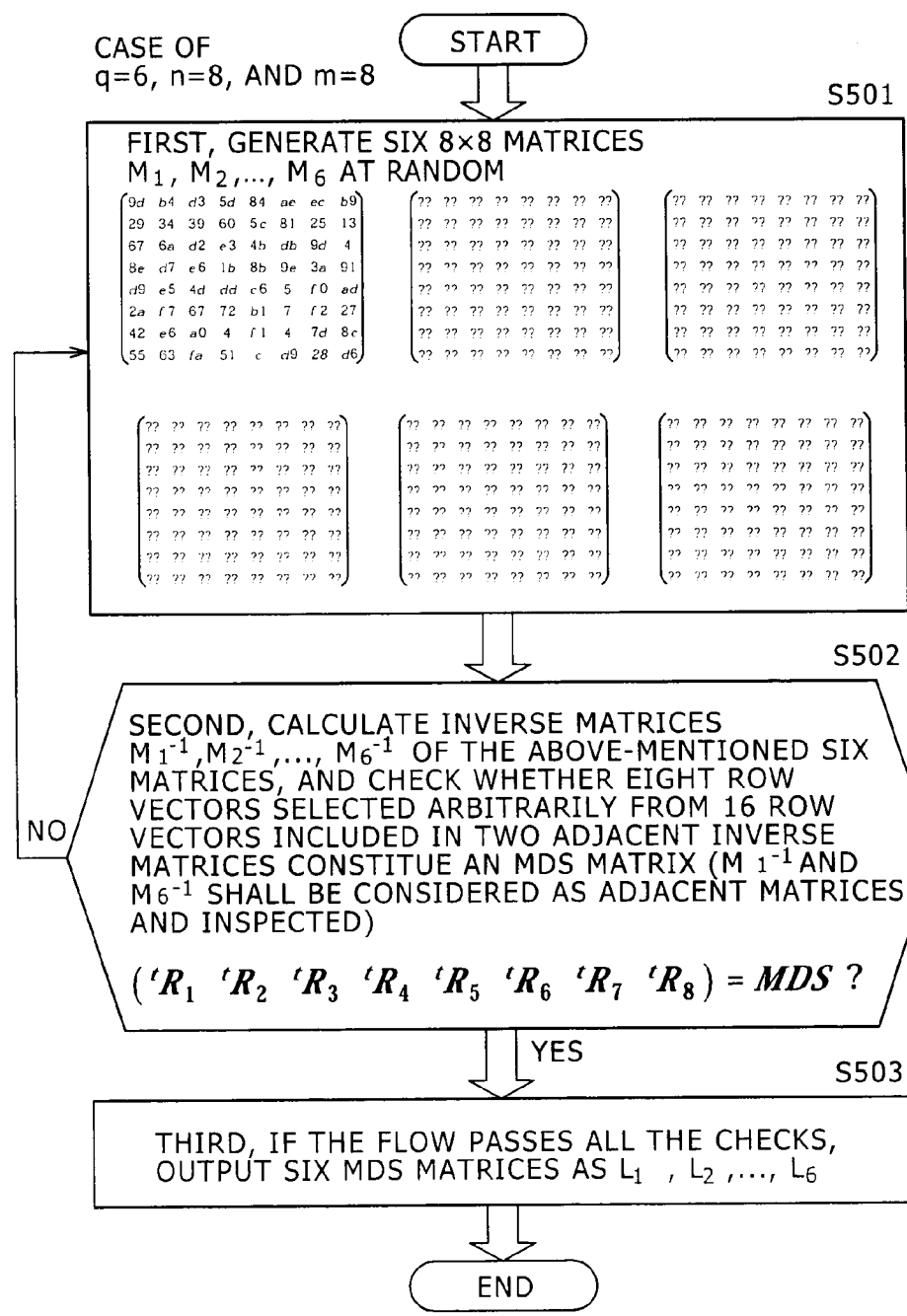
FIG. 16 is a flowchart explaining a processing example of generating square MDS matrices that realize improved resistance to linear cryptanalysis attacks as a generation technique of square MDS matrices that are the linear conversion matrices to be set in the F-functions of respective rounds.

Designating input: the number of necessary square MDS matrices by q, an enlargement order by n, and a matrix size by m, the q m-th square MDS matrices $M_1, M_2, \ldots, M_q$ are generated at random on $GF(2^n)$. The flowchart shown in FIG. 16 shows a processing example as with the number of square MDS matrices q=6, the extension order n=8, and the matrix size m=8.

[Step S502]

It is checked whether arbitrary m row vectors taken out from 2m row vectors included in two adjacent inverse matrices after calculating the inverse matrices $M_1^{-1}, M_2^{-1}, \ldots, M_q^{-1}$, of the q m-th square MDS matrices $M_1, M_2, \ldots,$ of $M_q$ constitute a square MDS matrix. $^tR$ in FIG. 16 denotes a transposed vector of a row vector. If the flow passed the check, the flow proceeds to Step S503; if not so, the flow returns to Step 401. Here, matrices $M1^{-1}, Mq^{-1}$ shall be considered as adjacent matrices. The square MDS matrix is a matrix satisfying the following properties. (a) It is a square matrix. (b) Determinants of all submatrices included in the matrix are not zero, namely, det (submatrix)≠0.

[Step S503]

The q m-th square MDS matrices $L_1, L_2, \ldots, L_q$ are outputted as square MDS matrices to be applied to the Feistel-type common-key-block cipher of round number 2r.

Through the above process, the q m-th square MDS matrices $L_1, L_2, \ldots, L_q$ are generated. Here, q satisfies q≦r.

Figure 15:
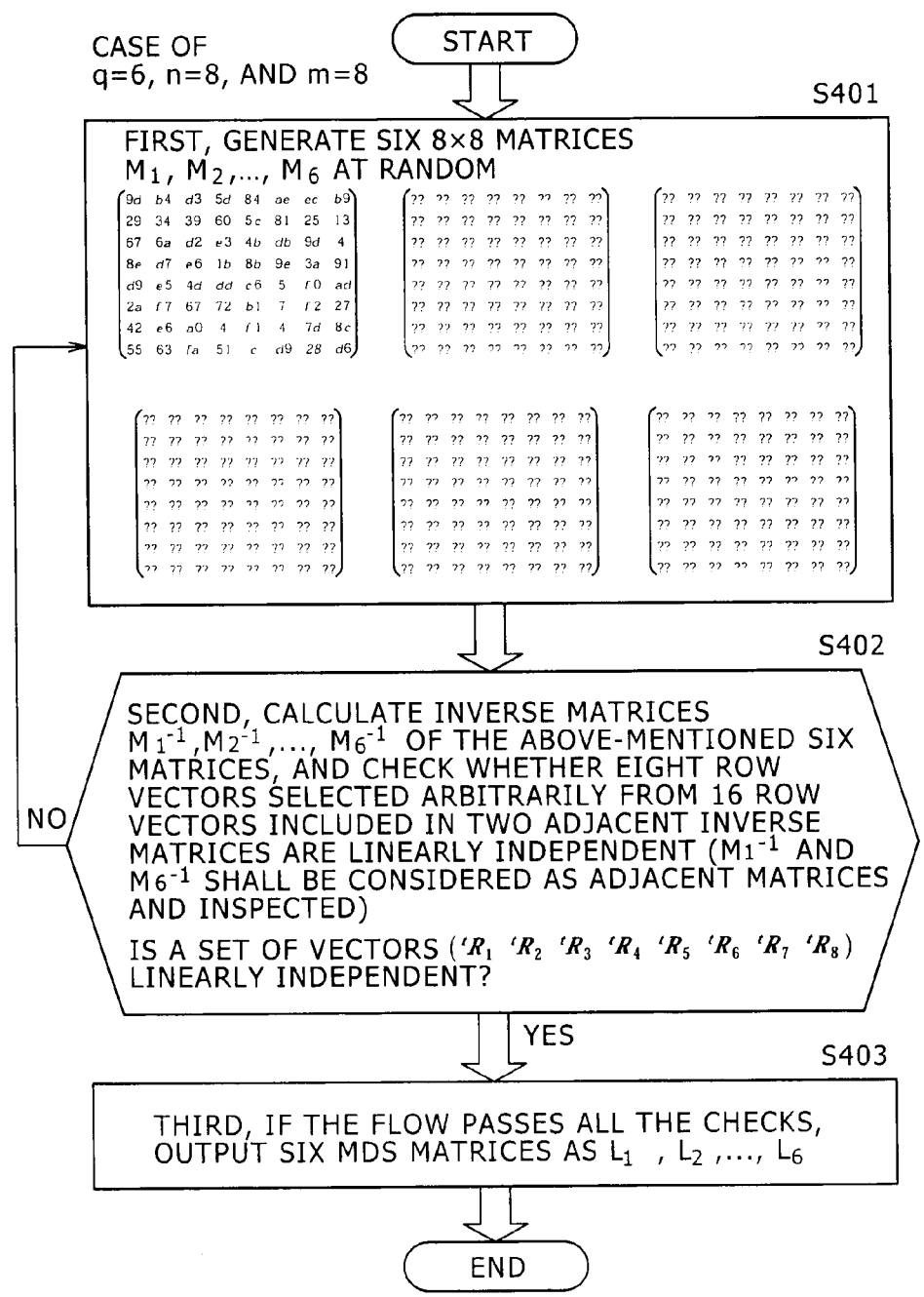
FIG. 15 is a flowchart explaining a processing example b1 of generating square MDS matrices that realize improved resistance to linear cryptanalysis attacks as a generation technique of square MDS matrices that are the linear conversion matrices to be set in the F-functions of respective rounds.

In the square MDS matrix generation processing in the processing example b1 described above, as explained in the processing sequence of FIG. 15, what is determined is linear independence when taking out arbitrary m column vectors from qm column vectors included in the inverse matrices $M_1^{-1}, M_2^{-1}, \ldots, M_q^{-1}$ of the q m-th square MDS matrices $M_1, M_2, \ldots, M_q$ in Step S402. In the square MDS matrix generation processing in this processing example b2, it is checked whether arbitrary m column vectors taken out from m column vectors included in inverse matrices $M_1^{-1}, M_2^{-1}, \ldots, M_q^{-1}$ of the q m-th square MDS matrices $M_1, M_2, \ldots, M_q$ constitute a square MDS matrix. That is, severer check will be executed.

Like the processing example b1 described previously, the q m-th square MDS matrices $L_1, L_2, \ldots, L_q$ generated by square MDS matrix generation processing that complies with a processing sequence shown in this FIG. 16 are set up as matrices to be applied to linear conversion processing of the linear conversion sections of the F-functions of respective stages in the Feistel-type common-key-block cryptographic structure of stage number (round number) 2r, according to processing [Step S23] and [Step S24] explained previously with reference to FIG. 10. That is, for odd-numbered stages, q square MDS matrices are designated as $L_1, L_2, \ldots, L_q, L_1, L_2, \ldots$ sequentially and repeatedly from the F-function of the upper stage, and for even-numbered stages, q square MDS matrices are designated as $L_1, L_2, \ldots, L_q, L_1, L_2, \ldots$ sequentially and repeatedly from the F-function of the lower stage.

Thus, the square MDS matrices of the even-numbered rounds and the square MDS matrices of the even-numbered rounds are arranged in mutually reverse orders, respectively, whereby it is guaranteed that encryption processing and decryption processing are the same except for processing of replacing a sequence of keys.

This configuration guarantees the following. (a) The linear conversion matrix of each F-function is a square MDS matrix. (b) Arbitrary m column vectors from inverse matrices of the linear conversion matrix included consecutively in odd-numbered rounds in the cryptographic function and of the linear conversion matrix included consecutively in even-numbered rounds therein constitute a square MDS matrix. These properties enables the difficulty in analysis by linear approximation in linear cryptanalysis attacks to be increased, and high-security cryptographic processing with increased difficulty in analysis, that is, whose key is difficult to analyze, is realized.

[(3-c) Example of Generation of Square MDS Matrices that Realize Improved Resistance to Differential Cryptanalysis Attacks and Linear Cryptanalysis Attacks and Setting them to the F-Functions]

Next, an example of generation of square MDS matrices that realize improved resistance to differential cryptanalysis attacks and linear cryptanalysis attacks and setting them to the F-functions will be explained.

The cryptographic algorithm with the resistance to differential cryptanalysis attacks is realized by applying the processing explained with reference to FIGS. 10 to 13 previously, that is, by setting up square MDS matrices to be applied to linear conversion in the linear processing sections of the F-functions by applying any one of the above-mentioned processing examples a1 (FIG. 11) to a3 (FIG. 13). Moreover, the cryptographic algorithm with the resistance to linear cryptanalysis attacks is realized by applying the processing explained with reference to FIG. 10 and FIGS. 14 and 15 previously, that is, by setting square MDS matrices to be applied to linear conversion in the linear processing sections of the F-functions by applying either of the above-mentioned processing examples b1 (FIG. 14) and b2 (FIG. 15).

The algorithm using square MDS matrices that realize improved resistance to differential cryptanalysis attacks and linear cryptanalysis attacks is implemented by setting up square MDS matrices generated by performing both one of processing of processing examples a1 (FIG. 11) to a3 (FIG. 12) and one of processing of the processing examples b1 (FIG. 14) and b2 (FIG. 15) as matrices to be applied to the linear conversion processing of the linear conversion sections of the F-functions of respective stages in the Feistel-type common-key-block cryptographic structure of stage number (round number) 2r.

That is, q square MDS matrices are generated by any of the following combinations: a processing example a1 and a processing example b1; a processing example a1 and a processing example b2; a processing example a2 and a processing example b1; a processing example a2 and a processing example b2; a processing example a3 and a processing example b1; a processing example a3 and a processing example b2; and are set up as matrices to be applied to linear conversion processing of the linear conversion sections of the F-functions of respective stages in the Feistel-type common-key-block cryptographic structure of round number 2r. That is, for odd-numbered stages, q square MDS matrices are repeatedly designated as $L_1, L_2, \ldots, L_q, L_1, L_2, \ldots$ sequentially from the F-function of the upper stage, and for even-numbered stages, q square MDS matrices are repeatedly designated as $L_1, L_2, \ldots, L_q, L_1, L_2, \ldots$ sequentially from the F-function of the lower stage. By this setting, cryptographic processing that realizes improved resistance to differential cryptanalysis attacks and linear cryptanalysis attacks becomes possible.

One example of generation processing of square MDS matrices for implementing cryptographic processing that realizes improved resistance to differential cryptanalysis attacks and linear cryptanalysis attacks will be explained with reference to FIG. 17. This processing is a combination of the processing example a2 and the processing example b2 described above.

[Step S601]

Designating input: the number of necessary square MDS matrices by q, the extension order by n, and the matrix size by m, the q m-th square matrices are generated at random on $GF(2^n)$. The flowchart shown in FIG. 17 shows a processing example as with the number of square MDS matrices q=6, the extension order n=8, and the matrix size m=8.

[Step S602]

When m columns are taken out from qm columns included in the q m-th square MDS matrices, $M_1, M_2, \ldots, M_q$, it is checked whether they constitute a square MDS matrix. If the flow passed the check, the flow proceeds to Step S603; if not so, the flow returns to Step S601. Here, the square MDS matrix means a matrix satisfying the following properties. (a) It is a square matrix. (b) A determinant of any submatrix included in the matrix is not zero, namely det(submatrix)≠0.

[Step S603]

Inverse matrices $M_1^{-1}, M_2^{-1}, \ldots, M_q^{-1}$ of the q m-th square MDS matrices $M_1, M_2, \ldots, M_q$ are calculated, and it is checked whether arbitrary m row vectors are taken out from 2m row vectors included in two adjacent inverse matrices constitute a square MDS matrix. tR in FIG. 17 denotes a transposed vector of a row vector. If the flow passed the check, the flow proceeds to Step S604; if not so, the flow returns to Step S601. Here, matrices M1−1, Mq−1 shall be considered as adjacent matrices.

[Step S604]

The q m-th square MDS matrices $L_1, L_2, \ldots, L_q$ are outputted as square MDS matrices to be applied to the Feistel-type common-key-block cipher of round number 2r.

Through the above process, the q m-th square MDS matrices $L_1, L_2, \ldots, L_q$ are generated. Here, q satisfies q≦r.

The q m-th square MDS matrices $L_1, L_2, \ldots, L_q$ generated by the square MDS matrix generation processing that followed a processing sequence shown in this FIG. 17 are set up as matrices to be applied to linear conversion processing of the linear conversion sections of the F-functions sections of respective stages in the Feistel-type common-key-block cryptographic structure of stage number (round number) 2r, according to processing of [Step S23] and [Step S24] explained previously with reference to FIG. 10. That is, for odd-numbered stages, q square MDS matrices are repeatedly designated as $L_1, L_2, \ldots, L_q, L_1, L_2, \ldots$ sequentially from the F-function of the upper stage, and for even-numbered stages, q square MDS matrices are repeatedly designated as $L_1, L_2, \ldots, L_q, L_1, L_2, \ldots$ sequentially from the F-function of the lower stage.

Thus, square MDS matrices of the even-numbered rounds and square MDS matrices of the odd-numbered rounds are arranged in mutually reverse orders, respectively, whereby it is guaranteed that encryption processing and decryption processing are the same except for processing of replacing a sequence of keys.

This configuration guarantees the following respects (a) to (c). (a) The linear conversion matrix of each F-function is a square MDS matrix. (b) Arbitrary m column vectors of the linear conversion matrix included in at least consecutive q F-functions in odd-numbered round in the cryptographic function constitute a square MDS matrix. (c) Arbitrary m column vectors of the linear conversion matrix included in at least consecutive q F-functions in even-numbered rounds therein continue a square MDS matrix. Since these respects (a) to (c) are guaranteed, in the Feistel-type common-key-block cryptographic structure with round number of the plurality of steps, it is guaranteed that the simultaneous difference cancellation by contribution of m or less active S-boxes does not occur in the consecutive 2q−1 rounds. Further, (d) from the property of the square MDS matrix, it is guaranteed that the number of nonzero element in difference values obtained by contribution of "a" (a≦m) active S-boxes becomes m+1−a or more. Therefore, the minimum value of the number of active S-boxes in the whole of the cryptographic function increases. Further, the following is guaranteed. (e) Arbitrary m column vectors from inverse matrices of the linear conversion matrices included consecutively in the odd-numbered rounds and of the linear conversion matrices included consecutively in the even-numbered rounds both in the cryptographic function constitute a square MDS matrix. These properties enable the difficulty in analysis by linear approximation in linear cryptanalysis attacks to be increased, and high-security cryptographic processing with increased difficulty in analysis, that is, whose key is difficult to analyze, is realized.

Thus, by this processing example, difficulty in analysis in both differential cryptanalysis attacks and linear cryptanalysis attacks is increased, and the high-security cryptographic processing whose key is difficult to analyze is realized. The example shown in FIG. 17 was, as described above, an example of generation of the square MDS matrices by the combination of the processing example a2 and the processing example b2 explained previously. However, other generation can be adopted. That is, q square MDS matrices are generated by combining one of the following pairs: the processing example a1 and the processing example b1, the processing example a1 and the processing example b2, the processing example a2 and the processing example b1, the processing example a3 and the processing example b1, and the processing example a3 and the processing example b2. For odd-numbered stages, q square MDS matrices are repeatedly designated as $L_1, L_2, \ldots, L_q, L_1, L_2, \ldots$ sequentially from the F-function of the upper stage, and for even-numbered stages, q square MDS matrices are repeatedly designated as $L_1, L_2, \ldots, L_q, L_1, L_2, \ldots$ sequentially from the F-function of the lower stage, as a matrix to be applied in the linear conversion sections of the F-functions of respective stages in the Feistel-type common-key-block cryptographic structure of stage number (round number) 2r; whereby high-security cryptographic processing that has enhanced difficulty in analysis both in differential cryptanalysis attacks and in linear cryptanalysis attacks and whose key is difficult to analyze can be realized.

Although the explanation up to this point assumed that the linear conversion matrix is a matrix of m×m defined on GF($2^n$) and used in a data conversion operation from mn bit to mn bit, the similar effect to differential cryptanalysis attacks and linear cryptanalysis attacks can be effectively obtained even in the case where a mn×mn matrix defined on GF(2) is used. Actually, arbitrary matrix on GF($2^n$) can be brought into one-to-one correspondence with a matrix on GF(2) showing the same conversion. Therefore, it can be said that the matrix on GF(2) shows more general representation. The matrix on GF(2) has mn columns and mn rows, which are n-times those in the case of GF($2^n$). For this reason, the first column of the matrix on GF($2^n$) corresponds to the first to n-th columns of the matrix on GF(2), and the first row of the matrix on GF($2^n$) corresponds to the first to n-th rows thereof. That is, the i-th row corresponds to [(i−1)+1]-th to [(i−1)+n]-th rows, and the i-th column corresponds to [(i−1)+1]-th to [(i−1)+n]-th columns. Therefore, in order to do an operation of extracting a column or row on GF($2^n$), if a matrix defined on GF(2) is used, it is necessary to do an operation of extracting n rows or n columns that correspond to the column or row on GF(2) correspondingly. The operation of extracting m rows or columns on GF(2) requires extracting n rows or columns for m times on GF(2), and as a result a mn×mn matrix can be obtained. The above coordination enables the matrices to be easily extended to matrices defined on GF(2).

Figure 18:
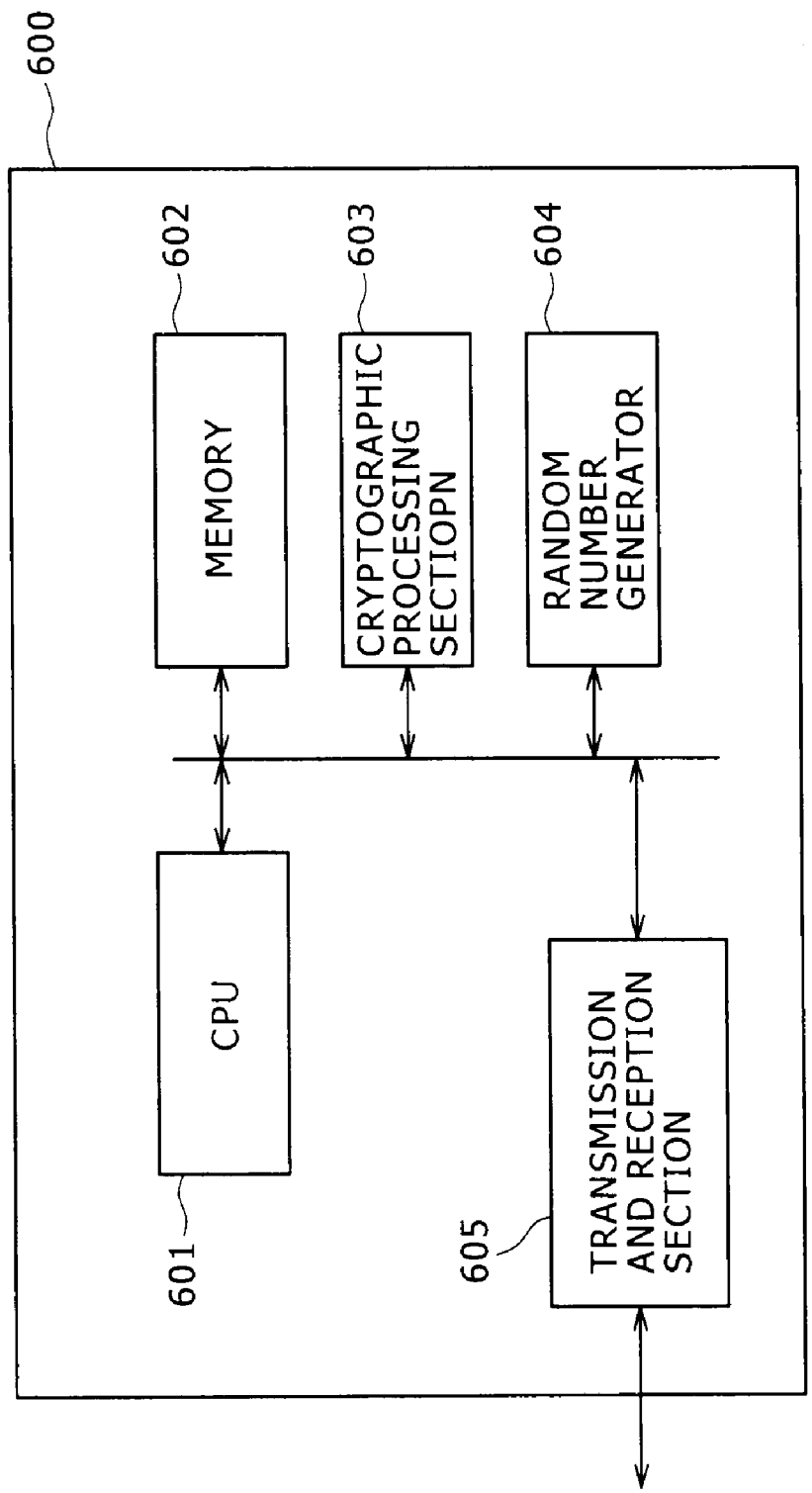
FIG. 18 is a diagram showing an example of a configuration of an IC module as a cryptographic processing apparatus for performing cryptographic processing according to this invention.

Finally, FIG. 18 shows an example configuration of an IC module 600 as a cryptographic processing apparatus for performing cryptographic processing. The above-mentioned processing is executable in various information processing apparatuses, for example, a PC, an IC card, a reader/writer, etc. and the IC module 600 shown in FIG. 18 can be used as a constituent for these various apparatuses.

A CPU (Central Processing Unit) 601 shown in FIG. 18 is a processor for executing various programs, such as of starting cryptographic processing, ending it, controlling transmission/reception of data, controlling data transfer between configuration sections, and executing various programs. Memory 602 consists of ROM (Read-Only-Memory) for storing a program that the CPU 601 executes or fixed data as operation parameters, RAM (Random Access Memory) used as a storage area of the program executed in processing of the CPU 601, parameters always varying in processing the program, and a work area, etc. The memory 602 can also be used as a storage areas of key data necessary for cryptographic processing etc. It is preferable that a storage area of data etc. constructed as memory with a tamper-resistant structure.

A cryptographic processing section 603 performs encryption, decryption, etc. that follows, for example, the Feistel-type common-key-block cryptographic processing algorithm described above. Although the example in which the cryptographic processing means is made as an individual module is shown, it may be so configured that, for example, a cryptographic program is stored in ROM and the CPU 601 reads and executes the stored program in the ROM without providing such an independent cryptographic module.

A random number generator 604 executes processing of generating random numbers that are necessary in generation of a key that is required for cryptographic processing and the like.

A transmission/reception section 605 is a data communication section for performing data communication externally, which executes data communication with, for example, a reader-writer, etc. and an IC module, outputting a ciphertext generated in the IC module or inputting thereinto data etc. from the external reader writer etc.

In the foregoing, this invention was described in detail with reference to specific embodiments. However, it is obvious that those skilled in the art can accomplish modification and substitution of the embodiment within deviating the scope and spirits of this invention. That is, this invention was disclosed in the form of illustration, and should not be interpreted restrictively. In order to judge the gist of this invention, the column of the patent claim should be considered.

Note that a series of processing explained in the description can be implemented by hardware, by software, or by a combination of the both. When performing processing by software, a program that records a processing sequence can be executed by installing it in memory built in exclusive hardware in a computer, or can be executed by installing it in a general purpose computer capable of performing various processing.

For example, a program can be recorded in beforehand on a hard disk or ROM (Read Only Memory) as a record medium. Alternatively, the program can be stored temporarily or permanently in removable record media, such as a flexible disk, CD-ROM (Compact Disc Read Only Memory), an MO (Magneto optical) disk, a DVD (Digital Versatile Disc), a magnetic disk, and semiconductor memory. Such a removable record medium can be provided as the so-called a software package.

In addition to install the program in the computer from a removable record medium as described above, the following scheme can be adopted. The program is wireless-transferred to the computer from a download site, or transferred by cable to the computer through a network, such as a LAN (Local Area Network) and the Internet, while the computer receives the program being transferred in such a way and installs it in a recording medium, such as an internal hard disk.

Note that various kinds of processing written in the description may be executed in parallel or individually according to processing capability of the apparatus performing the processing or if needed as well as being executed in time sequence according to the description. Note that in this description, the system is one that has a structure of logical combination of a plurality of devices, but being not limited to systems each having its own devices in the same enclosure.

As described above, according to the configuration of this invention, in the Feistel-type common-key-block cryptographic processing of executing the SPN-type F-function that has the nonlinear conversion section and the linear conversion section repeatedly for a plurality of rounds, it is configured to perform the following. While performing linear conversion processing of the F-function corresponding to each of a plurality of rounds as linear conversion processing that applies the square MDS (Maximum Distance Separable) matrices, square MDS matrices $L_a$, $L_b$ that are different at least in the consecutive odd-numbered rounds and in the consecutive even-numbered rounds are applied, respectively, and linear conversion processing with square MDS matrices is performed, wherein square MDS matrices $L_a$, $L_b$ different at least in the consecutive even-numbered rounds and in the consecutive odd-numbered rounds are applied, and a matrix composed of m column vectors selected arbitrarily from column vectors constituting the inverse matrices $L_a^{-1}$, $L_b^{-1}$ of the square MDS matrices is linearly independent or makes up a square MDS matrix. Consequently, the resistance to linear cryptanalysis attacks in the common-key-block cipher is improved, and difficulty in analyzing an encryption key etc. is increased, so that high-security cryptographic processing is realized. Therefore, this invention can be applied to a cryptographic processing apparatus that is required to enhance the difficulty in analysis to find a key and have high security.

Furthermore, according to the configuration of this invention, in the Feistel-type common-key-block cryptographic processing that executes the SPN-type F-function having the nonlinear conversion section and the linear conversion section repeatedly over a plurality of rounds is configured to perform linear conversion processing of the F-function corresponding to each of the plurality of round as linear conversion processing that applies square MDS (Maximum Distance Separable) matrices, and at the same time applies square MDS matrices that are different at least in the consecutive even-numbered rounds and in the consecutive odd-numbered rounds, wherein these square MDS matrices exhibit linear independence or make up square MDS matrices. Therefore, it is guaranteed that the simultaneous difference cancellation by contribution of active S-boxes does not occur, and it becomes possible to enlarge the minimum number of active S-boxes in the whole of the cryptographic function that is one of robustness indexes to differential cryptanalysis attacks in the common-key-block cipher. By this configuration, the resistance to both linear cryptanalysis attacks and differential cryptanalysis attacks is improved, and thereby higher-safety cryptographic processing is implemented. Therefore, this invention can be applied to the cryptographic processing apparatus that is required to increase difficulty in analyzing a key and have high security.

The invention claimed is:

1. An information processing apparatus, comprising:
a tangible memory unit that stores key data necessary for cryptographic processing;
a processor configured to execute various programs and to control starting and ending of the cryptographic processing; and
an encryption processing apparatus configured to perform the cryptographic processing, the encryption processing apparatus including
a first encryption processing section including a first nonlinear transformation section configured to transform first input information into first nonlinear transformed information, and a first linear transformation section configured to transform the first nonlinear transformed information into first linear transformed information;
a second encryption processing section including a second nonlinear transformation section configured to transform second input information into second nonlinear transformed information, and a second linear transformation section configured to transform the second nonlinear transformed information into second linear transformed information;
an exclusive-or section configured to perform an exclusive-or operation based on the second linear transformed information and the first linear transformed information,
wherein when the first nonlinear transformed information is expressed as a first sequence vector, the first linear transformed information is expressed as a second sequence vector, the second nonlinear transformed information is expressed as a third sequence vector, and the second linear transformed information is expressed as a fourth sequence vector, then (1) a first row vector chosen from a first inverse matrix of a first matrix that transforms the first sequence vector to the second sequence vector, and (2) a second row vector chosen from a second inverse matrix of a second matrix that transforms the third sequence vector to the fourth sequence vector, are linearly independent.

2. The information processing apparatus of claim 1, wherein the memory unit comprises:
a read-only memory that stores operation parameters and the various programs that the processor executes; and
a random access memory that stores parameters that vary during execution of the various programs.

3. The information processing apparatus of claim 1, further comprising:
a random number generator configured to generate random number necessary to generate the key data.

4. The information processing apparatus of claim 1, further comprising:
a transmission/reception unit configured to execute data communication with an external device.

5. The information processing apparatus of claim 1, wherein the information processing apparatus is a computer.

6. The information processing apparatus of claim 1, wherein the information processing apparatus is an IC card.

7. The information processing apparatus of claim 1, wherein the information processing apparatus is a reader/writer apparatus.

8. The information processing apparatus according to claim 1, wherein the encryption processing apparatus further comprises:
a key acquiring section configured to acquire a common key that is used in a decryption apparatus.

9. The information processing apparatus according to claim 1, wherein the encryption processing apparatus further comprises:
a key expanded section configured to output expanded keys, and wherein one of the expanded keys is inputted to the first encryption processing section, and the other of the expanded keys is inputted to the second encryption processing section.

10. An information processing apparatus, comprising:
means for storing key data necessary for cryptographic processing;
a processor configured to execute various programs and to control starting and ending of the cryptographic processing; and
an encryption processing apparatus configured to perform the cryptographic processing, the encryption processing apparatus including
a first encryption processing section including first nonlinear transformation means for transforming first input information into first nonlinear transformed information, and first linear transformation means for transforming the first nonlinear transformed information into first linear transformed information;
a second encryption processing section including second nonlinear transformation means for transforming second input information into second nonlinear transformed information, and second linear transformation means for transforming the second nonlinear transformed information into second linear transformed information;
means for performing an exclusive-or operation based on the second linear transformed information and the first linear transformed information,
wherein when the first nonlinear transformed information is expressed as a first sequence vector, the first linear transformed information is expressed as a second sequence vector, the second nonlinear transformed information is expressed as a third sequence vector, and the second linear transformed information is expressed as a fourth sequence vector, then (1) a first row vector chosen from a first inverse matrix of a first matrix that transforms the first sequence vector to the second sequence vector, and (2) a second row vector chosen from a second inverse matrix of a second matrix that transforms the third sequence vector to the fourth sequence vector, are linearly independent.

11. An information processing apparatus, comprising:
a tangible memory unit that stores key data necessary for cryptographic processing;
a processor configured to execute various programs and to control starting and ending of the cryptographic processing; and
an decryption processing apparatus configured to perform the cryptographic processing, the decryption processing apparatus including
  a first decryption processing section, including a first nonlinear transformation unit configured to transform first input information to first nonlinear transformed information, and a first linear transformation unit configured to transform from said nonlinear transformed information to first linear transformed information;
  a second decryption processing section, including a second nonlinear transformation unit configured to transform second input information to second nonlinear transformed information, and a second linear transformation unit configured to transform from said nonlinear transformed information to second linear transformed information; and
  an exclusive-or section configured to perform an exclusive-or operation based on said second linear transformed information and said first linear transformed information,
  wherein when said first nonlinear transformed information is expressed as a first sequence vector, said first linear transformed information is expressed as a second sequence vector, said second nonlinear transformed information is expressed as a third sequence vector, and said second linear transformed information is expressed as a fourth sequence vector, a first row vector chosen from an inverse matrix of a first matrix, which indicates transformation from said first sequence vector to said second sequence vector, and a second row vector chosen from an inverse matrix of said second matrix, which indicates a transformation from said third sequence vector to said fourth sequence vector, are linearly independent.

12. The information processing apparatus of claim 11, wherein the memory unit comprises:
  a read-only memory that stores operation parameters and the various programs that the processor executes; and
  a random access memory that stores parameters that vary during execution of the various programs.

13. The information processing apparatus of claim 11, further comprising:
  a random number generator configured to generate random number necessary to generate the key data.

14. The information processing apparatus of claim 11, further comprising:
  a transmission/reception unit configured to execute data communication with an external device.

15. The information processing apparatus of claim 11, wherein the information processing apparatus is a computer.

16. The information processing apparatus of claim 11, wherein the information processing apparatus is an IC card.

17. The information processing apparatus of claim 11, wherein the information processing apparatus is a reader/writer apparatus.

18. The information processing apparatus of claim 11, wherein the decryption processing apparatus further comprises:
  a key acquiring section configured to acquire the common key.

19. The information processing apparatus of claim 11, wherein the decryption apparatus further comprises:
  a key expanded section configured to output expanded keys, and wherein one of the expanded keys is inputted to the first decryption processing section, and the other of the expanded keys is inputted to the second decryption processing section.

* * * * *